US012762921B2

(12) United States Patent
Russ et al.

(10) Patent No.: US 12,762,921 B2
(45) **Date of Patent: *Oct. 13, 2026**

(54) DYNAMIC WAGERING FEATURES BASED ON NUMBER OF ACTIVE PLAYERS

(71) Applicant: IGT, Las Vegas, NV (US)

(72) Inventors: Michael Russ, Graz (AT); Daniel Landry, Moncton (CA); David Small, Moncton (CA); Lukas Angermayer, Graz (AT); David Froy, Lakeville-Westmorland (CA); Bruno Rittner, Hausmannstaetten (AT); Sven Aurich, Schwanberg (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,779

(22) Filed: May 10, 2023

(65) Prior Publication Data

US 2023/0274605 A1 Aug. 31, 2023

Related U.S. Application Data

(63) Continuation of application No. 17/443,657, filed on Jul. 27, 2021, now Pat. No. 11,670,130.

(51) Int. Cl.
*G07F 17/32* (2006.01)
*G06F 7/58* (2006.01)

(52) U.S. Cl.
CPC .......... *G07F 17/3206* (2013.01); *G06F 7/588* (2013.01); *G07F 17/3209* (2013.01);
(Continued)

(58) Field of Classification Search
CPC ............. G07F 17/3209; G07F 17/3239; G07F 17/3244; G07F 17/3211; G07F 17/3213;
(Continued)

(56) References Cited

U.S. PATENT DOCUMENTS 5,816,920 A 10/1998 Hanai
6,186,894 B1 * 2/2001 Mayeroff ............... G07F 17/34 463/16

(Continued)

OTHER PUBLICATIONS

U.S. Appl. No. 17/443,657, filed Jul. 27, 2021 now U.S. Pat. No. 11,670,130.

(Continued)

*Primary Examiner* — Justin L Myhr
(74) *Attorney, Agent, or Firm* — Sheridan Ross P.C.

(57) ABSTRACT

The present disclosure relates generally to gaming devices, systems, and methods. As an example, a gaming device is disclosed to generate game outcomes based on game instructions applying game rules to user inputs; cause gameplay graphics to be rendered by the user interface in accordance with the game outcomes; receive, from a sensor, information that enables the processor to identify a number of players positioned in proximity of the user interface; dynamically modify the game rules based on the identified number of players being greater than one; generate additional game outcomes based on the game instructions applying the modified game rules to user inputs; and cause additional gameplay graphics to be rendered by the user interface in accordance with the additional game outcomes.

20 Claims, 18 Drawing Sheets

(52) U.S. Cl.
CPC ...... *G07F 17/3211* (2013.01); *G07F 17/3227* (2013.01); *G07F 17/323* (2013.01); *G07F 17/3267* (2013.01)

(58) Field of Classification Search
CPC ............. G07F 17/3225; G07F 17/3206; G07F 17/3202; G07F 17/3227; G07F 17/326; G07F 17/3223; G07F 17/3269; G07F 17/3216; A61B 2562/0247; G06F 7/58
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 10,029,170 B1 * | 7/2018 | Miller | G07F 17/3211 |
| 10,032,340 B1 | 7/2018 | Cohen | |
| 10,702,772 B2 | 7/2020 | Achmueller et al. | |
| 11,443,586 B2 * | 9/2022 | Shigeta | G07F 17/3225 |
| 11,670,130 B2 | 6/2023 | Russ et al. | |
| 2004/0038722 A1 * | 2/2004 | Gauselmann | G07F 17/32 463/16 |
| 2006/0068895 A1 | 3/2006 | Nguyen et al. | |
| 2009/0253503 A1 | 10/2009 | Krise et al. | |
| 2012/0120218 A1 | 5/2012 | Flaks et al. | |
| 2013/0023337 A1 * | 1/2013 | Bowers | G07F 17/3209 463/25 |
| 2013/0279706 A1 | 10/2013 | Marti | |
| 2015/0018072 A1 | 1/2015 | Palchetti et al. | |
| 2015/0310698 A1 | 10/2015 | Polis | |
| 2017/0169657 A1 * | 6/2017 | Keilwert | G07F 17/3225 |
| 2017/0270752 A1 | 9/2017 | Snow et al. | |
| 2019/0099660 A1 * | 4/2019 | Nelson | A63F 3/00157 |
| 2019/0172302 A1 | 6/2019 | Wolf et al. | |
| 2020/0324073 A1 * | 10/2020 | Rajan Kesavelu Shekar | G16H 40/63 |

OTHER PUBLICATIONS

U.S. Appl. No. 18/138,453, filed Apr. 24, 2023.
U.S. Appl. No. 18/195,779, filed May 10, 2023.
Official Action for U.S. Appl. No. 17/443,657, dated Aug. 9, 2022 21 pages.
Notice of Allowance for U.S. Appl. No. 17/443,657, dated Jan. 26, 2023 8 pages.
Notice of Allowance for U.S. Appl. No. 18/138,453, dated Mar. 28, 2024, 8 pages.
Official Action for U.S. Appl. No. 18/138,453, dated Dec. 5, 2023 5 pages.

* cited by examiner

DYNAMIC WAGERING FEATURES BASED ON NUMBER OF ACTIVE PLAYERS

CROSS REFERENCE TO RELATED APPLICATION

The present application is a continuation of and claims the benefit of and priority to U.S. patent application Ser. No. 17/443,657, filed Jul. 27, 2021, now U.S. Pat. No. 11,670,130, the entire disclosure of which is incorporated herein by reference.

BACKGROUND

The present disclosure is generally directed to electronic gaming machines and, in particular, features associated with electronic gaming machines.

Certain types of gaming machines include one or more primary wagering games and some may include one or more secondary games, such as bonus games. Many gaming machines enable gameplay to begin upon receiving a wager or appropriate credit from a user or player of the gaming machine. The amount of the wager may determine how much is eventually available to the user or player as an award, but the award may also be based on a randomly determined outcome of the gameplay events. Many gaming machines are also equipped with lights, buzzers, speakers, and other output devices to further enhance the player's experience with the gaming machine.

BRIEF SUMMARY

In certain embodiments, the present disclosure relates to a gaming device, a system, and methods. In some embodiments, a gaming device is provided, comprising: a user interface; a sensor configured to detect that multiple players are positioned in proximity of the user interface; a processor coupled to the user interface and to the sensor; and a memory coupled with the processor and storing therein instructions that, when executed by the processor, cause the processor to: generate game outcomes based on game instructions applying game rules to user inputs; cause gameplay graphics to be rendered by the user interface in accordance with the game outcomes; receive, from the sensor, information that enables the processor to identify a number of players positioned in proximity of the user interface; dynamically modify the game rules based on the identified number of players being greater than one; generate additional game outcomes based on the game instructions applying the modified game rules to user inputs; and cause additional gameplay graphics to be rendered by the user interface in accordance with the additional game outcomes.

In some embodiments, a method is provided, comprising: generating game outcomes at a gaming device based on game instructions applying game rules to user inputs; causing gameplay graphics to be rendered by a user interface of the gaming device in accordance with the game outcomes; determining that a first player and a second player are both positioned in proximity of the user interface substantially simultaneous with one another; modifying the game rules based on determining that the first player and the second player are both positioned in proximity of the user interface substantially simultaneous with one another; generating additional game outcomes based on the game instructions applying the modified game rules to user inputs received from the first player and the second player; and causing additional gameplay graphics to be rendered by the user interface in accordance with the additional game outcomes.

In some embodiments, a gaming system is provided, comprising: a processor; and memory coupled with the processor and storing instructions that, when executed by the processor, cause the processor to: generate game outcomes at a gaming device based on game instructions applying game rules to user inputs; cause gameplay graphics to be rendered by a user interface of the gaming device in accordance with the game outcomes; determine that a first player and a second player are both positioned in proximity of the user interface substantially simultaneous with one another; modify the game rules based on determining that the first player and the second player are both positioned in proximity of the user interface substantially simultaneous with one another; generate additional game outcomes based on the game instructions applying the modified game rules to user inputs received from the first player and the second player; and cause additional gameplay graphics to be rendered by the user interface in accordance with the additional game outcomes.

In some embodiments, a system is provided, comprising: a processor; and a memory, coupled with the processor, comprising instructions that are executable by the processor, wherein the instructions comprise instructions that: generate game outcomes based on game instructions applying game rules to user inputs; cause gameplay graphics to be rendered by a user interface of a gaming device in accordance with the game outcomes; receive, from a sensor, information that enables the processor to identify a number of players positioned in proximity of the user interface; dynamically modify the game rules based on the identified number of players being greater than one; generate additional game outcomes based on the game instructions applying the modified game rules to user inputs; and cause additional gameplay graphics to be rendered by the user interface in accordance with the additional game outcomes.

Additional features and advantages are described herein and will be apparent from the following Description and the figures.

DETAILED DESCRIPTION

Figure 1:
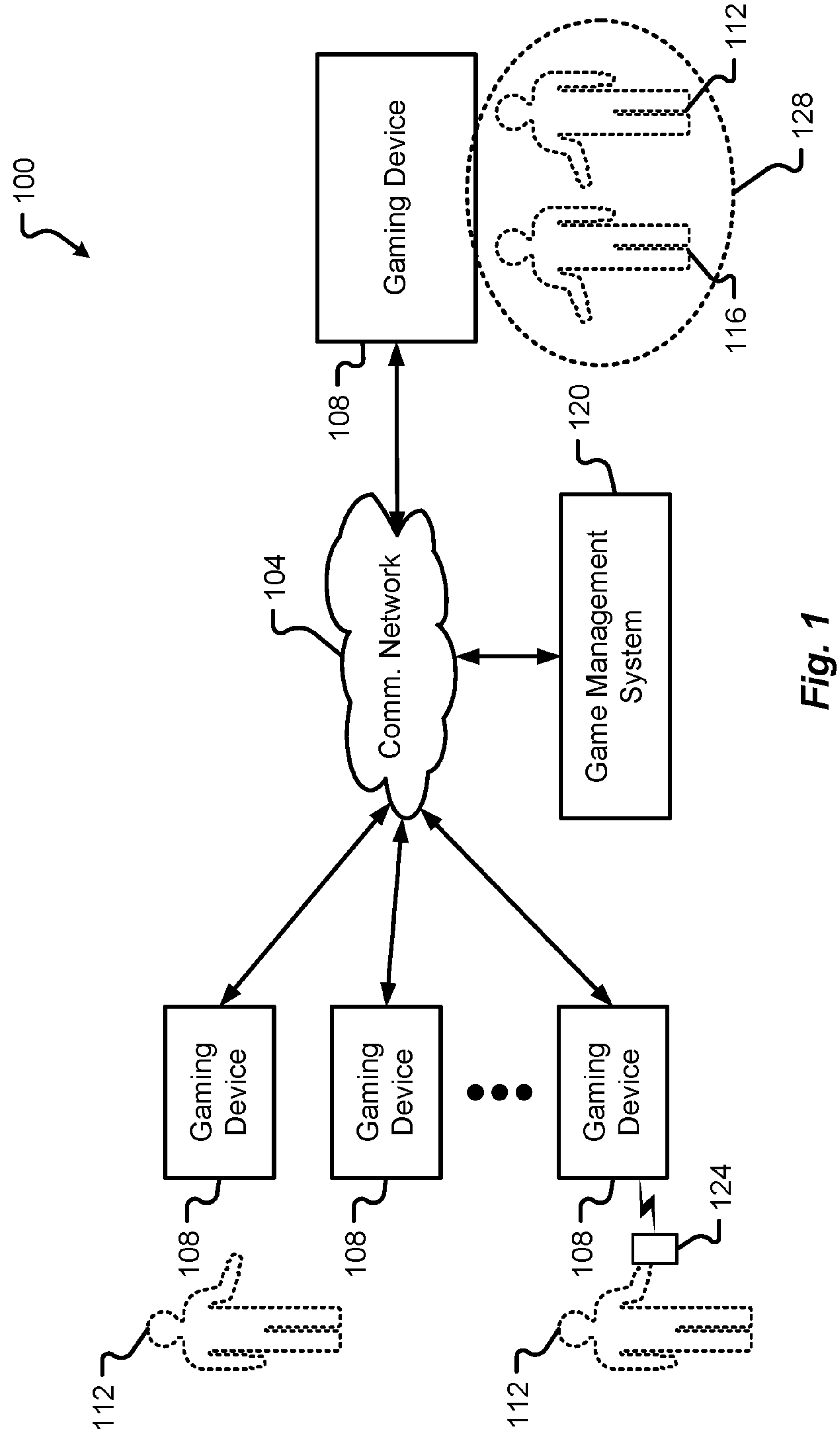
FIG. 1 is a block diagram of a gaming system that enables multi-player use of a gaming device in accordance with embodiments of the present disclosure.

Embodiments of the present disclosure will be described in connection with a gaming device that is configured to support single player activity and multi-player activity. The gaming device(s) depicted and described herein may correspond to any type of device or collection of devices. The types of gaming devices that may be configured to support multi-player as described herein may include an Electronic Gaming Machine (EGM), a mobile device, a communication device, a personal computing device, combinations thereof, etc.

While particular embodiments will be described in connection with the game management system having a particular architecture, it should be appreciated that certain behaviors or features of a gaming device may be carried out with other architectures.

Moreover, the examples of game management systems (whether centralized or distributed) depicted and described herein should not be construed as limiting. For instance, one example of the game management system may correspond to a casino game management system that is used to track player activity with respect to a particular game natively offered at the gaming machine (e.g., video poker, slots, keno, etc.). The casino game management system, in some embodiments, may correspond to a traditional slot Player Tracking System (PTS) that allows a player to play one or more casino games at the EGM. Another non-limiting example of the game management system may correspond to a sports wagering system. In some embodiments, a gaming device may be configured to support multi-player use whereby one player is playing a first type of game (e.g., a game of chance) while a second player is playing a different type of game (e.g., a different game of chance, a game of skill, etc.) or is involved in some other type of activity (e.g., sports wagering). Thus, a gaming device may support multiple different players and those players may or may not be playing the same game or game type.

In some embodiments, a gaming device is configured with a shareable seat (e.g., a "buddy seat") where two or more players are allowed to sit in front of the gaming device and interact with the gaming device substantially simultaneously. The gaming device may be provided with or connected to one or more sensors that are configured to detect the number of present players and each of their positions relative to the gaming device. Based on the number of players detected and their positions, the gaming device may be configured to automatically/dynamically adjust its user interface (outputs and/or inputs) to provide the one or two players with an optimized user interface experience, according to their sitting position.

To date, buddy-type gaming devices do not differentiate if there is one or two players in front of the device, or how many of them are playing. Specifically, the user interface of these existing gaming devices is static. Additionally, traditional buddy gaming devices are not optimized for a single player mode since they have a static user interface and, therefore, force the single player to sit at a given position on the supersized sitting area.

One aspect of the present disclosure provides an integration of one or multiple player-detecting sensors (e.g., cameras, pressure sensor arrays, proximity detectors, card readers, etc.) which detect both the number of users in front of the machine and each of their positions relative to the gaming device. By having such sensors, dynamic user interface adjustments for both single player mode or dual player mode can be applied in order to provide the one, two, three, or more users with optimized user interface capabilities.

Another aspect of the present disclosure is to enable a gaming device to modify game rules and/or game instructions based on the number of players detected in proximity with the gaming device and/or based on the number of players that are actively playing the gaming device. For instance, wagering features, odds, and/or options within the same game can change dynamically based on the number of active players interacting with a gaming device. The dynamic modification of the game instructions and/or game rules may provide the player(s) with enhanced and more enjoyable playing conditions if both players are playing, compared to having one player playing and one spectating/observing. Said another way, the gaming device may be configured to detect a number of players in proximity with the gaming device, detect a number of players currently interacting with the gaming device (e.g., playing), and/or detect whether a player in proximity of a gaming device is observing instead of actively playing the gaming device. Based on this determination, the gaming device may then be configured to actively involve a second player into the game by changing and/or adopting different game rules and providing wagering features to make the game increasingly attractive when it is played by two players instead of one (or three players instead of one or two players, etc.).

These and other aspects will now be described in further details with reference to FIGS. 1-11.

Gaming System

With reference initially to FIG. 1, details of an illustrative gaming system 100 will be described in accordance with at least some embodiments of the present disclosure. The components of the system 100, while depicted as having particular instructions and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include one or more communication networks 104 that interconnect and facilitate machine-to-machine communications between one or multiple gaming devices 108 and a game management system 120. It should be appreciated that a communication network 104 may correspond to one or many communication networks or cellular networks without departing from the scope of the present disclosure. In some embodiments, the gaming devices 108 and game management system 120 may be configured to communicate using various nodes or components of a communication network 104.

The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108 may be distributed throughout a single property or premises (e.g., a single casino floor) or the gaming devices 108 may be distributed among a plurality of different properties. In the depicted embodiment, three or more gaming devices 108 are depicted as being co-located in a common location (e.g., a casino) whereas another gaming device 108 is depicted as being positioned in a location different from the common location. It should be appreciated that more than one gaming device 108 may be separated by other gaming devices 108 by one or multiple different communication networks 104. Any number of the gaming devices 108 may be configured to support single player use and/or multi-player use.

Illustratively, one of the gaming devices 108 is shown to have two players 112, 116 located within a predetermined proximity 128 of the gaming devices. In this situation, the gaming device 108 may be configured to support simultaneous gameplay for both the first player 112 and the second player 116. The gaming device 108 may be configured to detect whether one, two, three, or more players 112, 116 are located within the predetermined proximity 128 using any suitable type of sensor(s). The gaming device 108 may also be configured to determine whether one of the players (e.g., the first player 112) is actively playing the gaming device 108 whereas another player (e.g., the second player 116) is not actively playing the gaming device 108 (e.g., is observing the first player 112), but is still positioned within the predetermined proximity 128. In such a situation, the gaming device 108 may be configured to provide attraction messages to the second player 116 while enabling the first player 112 to continue gameplay. The gaming device 108 may also be configured to determine if the multiple players 112, 116 are both actively playing at the gaming device 108. In some situations, the gaming device 108 may allow both players 112, 116 to play the same game or different games.

The various gaming devices 108 may utilize the same or different types of communication protocols to connect with the communication network 104. It should also be appreciated that the gaming devices 108 may or may not present the same type of game or wagering interface to a player 112, 116. For instance, a first gaming device 108 may correspond to a gaming machine that presents a slot game to the player 112, 116, the second gaming device 108 may correspond to a sports betting terminal, and other gaming devices 108 may present lottery games or other types of games or a plurality of different games for selection and eventual play by a player 112, 116. A single gaming device 108 may be configured to provide different games to two different players at substantially the same time.

A gaming device 108 may correspond to a type of device that enables player 112 interaction in connection with making wagers, communicating, watching live competitive contests, playing games of skill, and/or playing games of chance. For instance, the gaming devices 108 may correspond to a type of device that enables a first player 112 and/or second player 116 to interact with a common set of game instructions and/or use shared resources of a gaming device to interact with different game instructions.

A player 112 may be allowed to carry a mobile device 124 and the mobile device 124 may also be used to interact with the game management system 120 and/or gaming device 108. A mobile device 124 may be utilized by the player 112 to create a player account, manage player profile information at the game management system 120, and/or connect with a gaming device 108. It should also be appreciated that a mobile device 124 may be provided with functionality similar or identical to a gaming device 108. In some embodiments, a mobile device 124 may be considered a particular type of gaming device 108 in that a player 112 may utilize the mobile device 124 and resources thereof to play games of chance or other types of wagering games.

In some embodiments, a player 112, 116 may login to the game management system 120 by presenting the mobile device 124 to a gaming device 108, which causes components of the gaming device 108 to initiate a login process with the game management system 120 on behalf of the player 112, 116.

As mentioned above, the game management system 120 may correspond to a system used by a casino operator to manage slot games, video poker games, bingo games, keno games, games of skill, or the like that are played on one or more of the gaming devices 108 and/or mobile devices 124. In some embodiments, the game management system 120 may correspond to a system used by the casino operator to manage sports wagers placed by users 112 either at a sports desk or at a gaming device 108. As another example, the game management system 120 may be used to manage and execute a lottery game or multiple lottery games. As will be discussed in further detail herein, the game management system 120 and/or game devices 108 themselves may be configured to modify one or more behaviors of a gaming device based on a number of players 112, 116 detected within a predetermined proximity 128 of the gaming device 108.

Gaming Device

Figure 2:
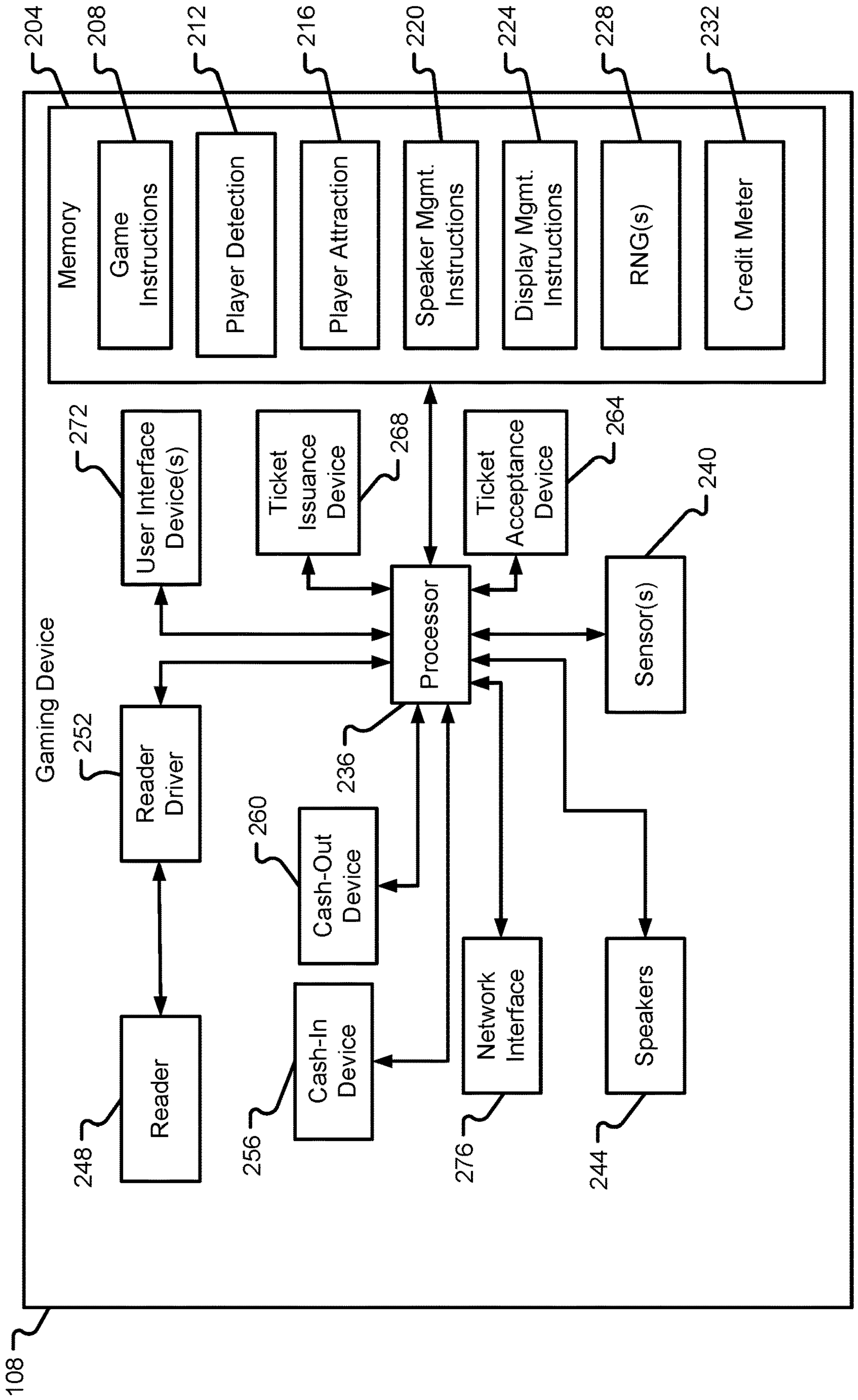
FIG. 2 is a block diagram depicting details of a gaming device in accordance with embodiments of the present disclosure.
Figure 4A:
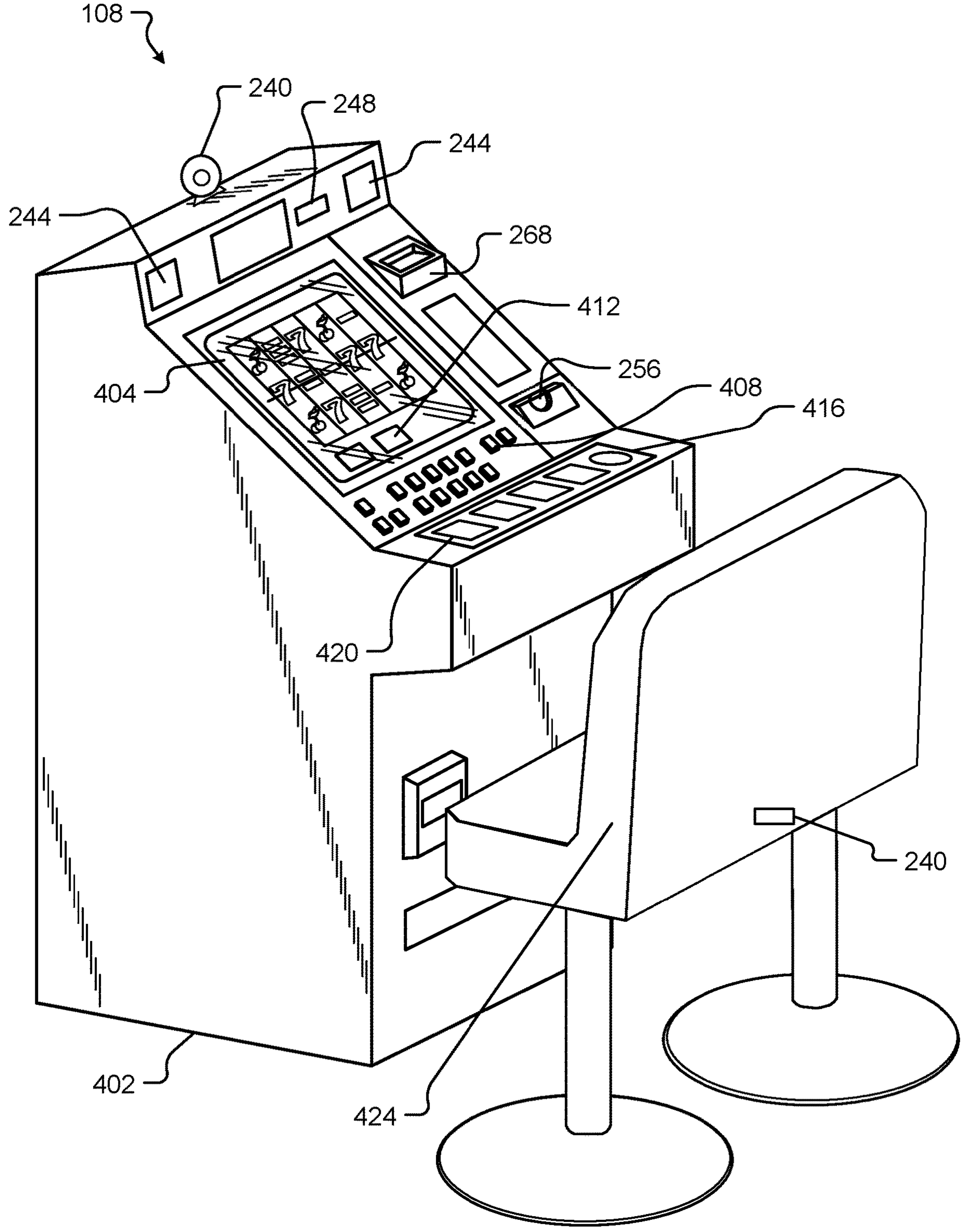
FIG. 4A is a diagram depicting a multi-player gaming device in accordance with embodiments of the present disclosure.
Figure 4B:
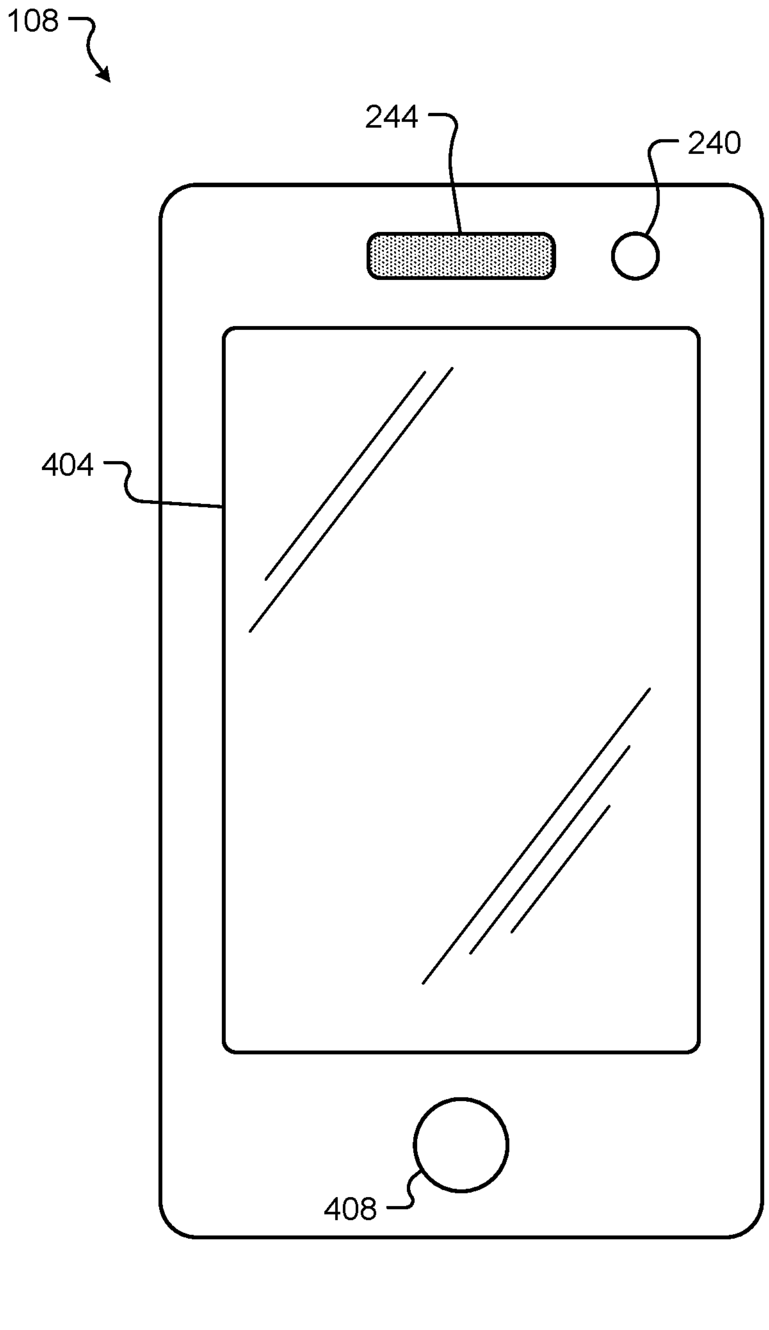
FIG. 4B is another diagram depicting a gaming device in accordance with embodiments of the present disclosure.

With reference now to FIGS. 2, 4A, and 4B, additional details of a gaming device 108 will be described in accordance with at least some embodiments of the present disclosure. While depicted as a gaming device 108, it should be appreciated that some or all of the components of a single gaming device 108 may be distributed across multiple gaming devices 108 (of the same or different type) without departing from the scope of the present disclosure. It should also be appreciated that one or more features of a gaming device 108 may be provided in a player's 112, 116 mobile device 124 without departing from the scope of the present disclosure. As shown in FIGS. 4A and 4B, a gaming device 108 may correspond to an EGM or a personal gaming device (e.g., a mobile device 124).

The gaming device 108 may include machine memory 204, a processor 236, a reader 248, a reader driver 252, a cash-in device 256, a cash-out device 260, a ticket acceptance device 264, a ticket issuance device 268, one or more user interface devices 272, one or more sensors 240, and one or more speakers 244.

The processor 236 may include one or multiple computer processing devices. In some embodiments, the processor 236 may include a microprocessor, a CPU, a microcontroller, or the like. The processor 236 may also be configured to execute one or more instructions stored in machine memory 204.

The machine memory 204 may include one or multiple computer memory devices that are volatile or non-volatile. The machine memory 204 may be configured to store instructions that enable player 112, 116 interaction with the gaming device 108, that enable the gaming device 108 to interact with a game of chance, that enable the gaming device 108 to interact with a game management system 120, that enable the player 112, 116 to interact with the game management system 120, that enable a gaming device 108 to support single player interactions, and/or that enable the gaming device 108 to change its behavior and support multi-player interactions. The machine memory 204 may be provided as a computer-readable medium that stores the instructions and various other data structures or code elements. Examples of instructions that may be stored in the machine memory 204 include game instructions 208, player detection instructions 212, player attraction instructions 216, speaker management instructions 220, display management instructions 224, and the like. The machine memory 204 is also shown to store various types of data or data sets describing the gaming device 108, details of a gaming session being conducted by a player 112, 116 at the gaming device 108, and/or details of a player 112, 116 of the gaming device 108. As some non-limiting examples, the machine memory 204 may be used to store preferences and settings of a player 112, 116 and a credit meter 232.

The game instructions 208, when executed by the processor 236, may enable the gaming device 108 to facilitate one or more games of chance or skill and produce interactions between the player 112, 116 and the game of chance or skill. In some embodiments, the game instructions 208 may include subroutines that present one or more graphics and/or audio content to the player 112, 116 via a user interface device 272 and/or speaker speakers 224 in accordance with inputs from the player detection instructions 212, the player attraction instructions 216, the speaker management instructions 220, and/or the display management instructions 224. The game instructions 208 may also include subroutines that calculate whether a particular game wager has resulted in a win or loss during the game of chance or skill, subroutines for determining payouts for the player 112, 116 in the event of a win, subroutines for determining whether a player 112, 116 has enough available credits in the credit meter 232 to allow a particular bet or set of bets, and any other subroutine or set of instructions that facilitate gameplay at or in association with the gaming device 108. In some embodiments, activities, outputs, or inputs of the game instructions may be stored or recorded as machine state information, which may also be stored in machine memory 204. As will be described herein, the game instructions 208 may be configured to dynamically modify during execution depending upon whether the player detection instructions 212 indicate that a single player or multiple players are within a predetermined proximity 128 of the gaming device 108 and/or depending upon whether a single player or multiple players are interacting with the gaming device 108.

The player detection instructions 212, when executed by the processor 236, may enable the gaming device 108 to receive inputs from sensor(s) 240 and determine whether one, two, three, or more players are positioned within proximity of the gaming device 108. The player detection instructions 212 may also be configured to determine whether one, two, three, or more players are currently interacting with the gaming device 108 or actively playing the gaming device 108. While depicted and described as instructions, it may also be possible to provide functions of the player detection instructions 212 via an Artificial Neural Network (ANN), Deep Learning Artificial Intelligence (AI) model, or the like. In other words, the functions of the player detection instructions 212 can be provided in a machine learning form or similar type of data model that has been trained to detect a number of players in proximity of a gaming device 108. In embodiments where two or more players are detected as interacting with the gaming device 108, the player detection instructions 212 may provide inputs to the game instructions 208 that cause the game instructions to switch from a single player mode of operation (e.g., where a single game is presented to a single player and game rules for a single game are implemented) to a multi-player mode of operation (e.g., where multiple players are presented one or more games and where game rules for a multi-player game are implemented).

When implementing a single player game, the game instructions 208 may utilize an output from a Random Number Generator (RNG) 228. When implementing a multi-player game, the game instructions may utilize a single output from the RNG 228 or may utilize multiple outputs from one or more different RNGs 228. In particular, the game instructions may be configured to dynamically increase a number of random outputs utilized by game rules based on the identified number of players detected by the player detection instructions 212 being greater than one. When multiple players are playing the gaming device 108, the game instructions 208 may invoke an additional RNG to generate additional random numbers for additional game outcomes. Thus, if two players are playing the gaming device 108, the game outcomes for one game may be determined based on outputs of a first RNG 228 whereas game outcomes for another game may be determined based on outputs of a second RNG 228. Alternatively, the game instructions 208 may utilize multiple different outputs from the same RNG 228 to facilitate multiple games of chance at substantially the same time even though the different random numbers are generated at different times by the RNG 228.

In embodiments where two players are detected in proximity of the gaming device 108 but only one of the players is actively playing the gaming device, the player detection instructions 212 may provide inputs to the player attraction instructions 216 that cause the player attraction instructions 216 to implement a partial attraction mode of operation. The player attraction instructions 216, when executed by the processor 236, may enable the gaming device 108 to operate in a full attraction mode or a multi-player attraction mode. In the full attraction mode, the player attraction instructions 216 may be configured to display GUI elements and provide sound outputs by the speakers 244 that aim to attract one or multiple players to play the gaming device 108. In this mode, it is assumed that no player is currently playing the gaming device 108. In the multi-player attraction mode, the player attraction instructions 216 may be configured to display GUI elements and provide sound outputs by the speakers 244 that aim to attract a second player (or additional players) to play along with a first player (e.g., player 112) that is already actively playing the gaming device 108. In some embodiments, the types of GUI elements and sounds provided in the multi-player attraction mode may explain to the player(s) 112, 116 the benefits of entering a multi-player mode. For instance, the players 112, 116 may be provided with a different version of a game by the game instructions, may be provided different win opportunities, may be provided different odds, may be provided different payout tables, etc. if multiple players interact with the gaming device 108 at the same time.

The game instructions 208 and/or payer attraction instructions 216 may utilize the speaker management instructions 220 to determine how best to mix gameplay audio with shared audio content. Mixing decisions made by the speaker management instructions 220 may be executed with a mixer. In some embodiments, the mixer may be used to mix two or more different audio streams (e.g., one audio stream containing gameplay audio for one game with gameplay audio for another game) into a single audio stream that is capable of being output by selected speakers 244. It should also be appreciated that the output of the mixer may be provided to headphones of a player 112, 116, to a user's 112 mobile device 124, or to some other user interface device 272 that ultimately presents the output of the mixer to the player 112, 116. As another example, both players 112, 116 may be provided with the same background sounds, but different event sounds (e.g., jingles, beeps, etc.) may be provided independently to one, but not both, of the players 112, 116.

The game instructions 208 and/or player attraction instructions 216 may also be configured to utilize display management instructions 224 to control visual content (e.g., GUI elements) displayed to one or more players. Specifically, as shown in FIGS. 4A and 4B, the gaming device 108 may include different types of user interface devices 272. Examples of such user interface devices 272 include, without limitation, a display 404 (e.g., an output device), physical buttons 408, and a reconfigurable button panel 416. The reconfigurable button panel 416 may include a mixed user input/user output device (e.g., a touch-sensitive display device) that is configured to present one or more soft buttons 420 to players 112, 116. The soft buttons 420 may correspond to areas of the button panel 416 that, when pressed or selected by a player 112, 116, cause the gaming device 108 to implement a certain function. The soft buttons 420 in the button panel 416 may be dynamically changed and modified depending upon a game being played and/or depending upon a number of players that are detected in proximity of the gaming device 108 (e.g., within the predetermined proximity 128). The types of information presented via the display 404 and/or button panel 416 may change depending upon whether a single or multiple players are interacting with the gaming device 108. For example, the number, position, and/or size of buttons 420 presented by the button panel 416 may be dynamically adjusted in response to a different number of players 112, 116 being detected in proximity of the gaming device 108. As a more specific but non-limiting example, the number of buttons 420 presented by the button panel 416 may be increased (e.g., a new button 420 or button type may be added) or decreased (e.g., an existing button 420 or button type may be removed). Newly added buttons 420 may be configured to provide new functionality for a multi-player use of the gaming device 108, where the functionality is not enabled when a single player is using the gaming device 108.

The credit meter 232 may correspond to a device or collection of devices that facilitates a tracking of wager activity or available wager credits at the gaming device 108. Such credits may be made available for wagers or bets placed on a game managed by the game management system 120. In some embodiments, the credit meter 232 may be used to store or log information related to various player 112, 116 activities and events that occur at the gaming device 108. The types of information that may be maintained in the credit meter 232 include, without limitation, player information, available credit information, Real Time Player (RTP) information, wager amount information, and other types of information that may or may not need to be recorded for purposes of accounting for wagers placed at the gaming device 108 and payouts made for a player 112, 116 during a game of chance or skill played at the gaming device 108. In some embodiments, the credit meter 232 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 108, and the like. Some or all of the data within the credit meter 232 may be reported to the game management system 120 via coordinated efforts of the processor 236 and network interface 276.

In some embodiments, a single credit meter 232 or multiple different credit meters 232 may be utilized when multiple players 112, 116 are interacting with the gaming device 108. As an example, when the game instructions 208 are operating in a multi-player mode, a single credit meter 232 may be used to track the collective activity and progress for both players. In other words, wagers made by either player may be debited against the same credit meter 232 and winnings made by either player may be credited to the same credit meter 232. As another example, each player may be provided their own instance of a credit meter 232 such that each player's activity is tracked with their own credit meter 232. As another example, each player may be provided their own instance of a credit meter 232 and an additional credit meter 232 may be used to track credits for multi-player wagers placed on a certain game (e.g., players may be allowed to utilize their own credit meter 232 or may be provided an option of utilizing a shared credit meter 232 for certain wagers). In this way, certain wagers or game features may only be presented to multiple players and winnings made off such wagers may be applied to the shared credit meter 232 rather than an individual player's credit meter 232.

The network interface 276 may correspond to or include any type of device that enables the gaming device 108 to connect with the communication network 104 or with another gaming device 108. In some embodiments, the network interface 276 may include one or more communication ports, switches, routes, etc. that connect with a cable or the like. Alternatively or additionally, the network interface 276 may include an antenna and/or a driver for the antenna that enables the gaming device 108 to wirelessly communicate with other machines.

The cash-in device 256 may include a bill acceptor, a coin acceptor, a chip acceptor or reader, or the like. In some embodiments, the cash-in device 256 may also include credit card reader hardware and/or software. The cash-out device 260 may operate and issue cash, coins, tokens, or chips based on an amount indicated within the credit meter 232. In some embodiments, the cash-out device 260 may include a coin tray or the like and counting hardware configured to count and distribute an appropriate amount of coins or tokens based on a user's 112 winnings or available credit within the credit meter 232.

The gaming device 108 may also be provided with a ticket acceptance device 264 that is configured to accept or scan physically printed tickets/vouchers and extract appropriate information therefrom. In some embodiments, the ticket acceptance device 264 may include one or more machine vision devices (e.g., a camera, IR scanner, optical scanner, barcode scanner, etc.), a physical ticket acceptor, a shredder, etc. The ticket acceptance device 264 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's mobile device 124, for example.

The ticket issuance device 268 may be configured to print or provide physical tickets/vouchers to users 112. In some embodiments, the ticket issuance device 268 may be configured to issue a ticket/voucher consistent with an amount of credit available to a player 112, 116, possibly as indicated within the credit meter 232.

The user interface device(s) 272 may correspond to any type of mechanical or software-based input and/or output device. In some embodiments, the user interface device(s) 272 may be provided on a common panel or portion of the gaming device 108 and may be used to initiate a predetermined function in response to being pressed by the player 112, 116. In addition to the examples of user interface devices 272 described above, it should be appreciated that a user interface device 272 may alternatively or additionally take the form of one or more depressible buttons, a lever or "one armed bandit handle," etc. The user interface device(s) 272 may include components like a display 404 that present content to the player 112, 116 in a visual fashion (e.g., displays, lights, screens, etc.). The user interface device(s) 272 may include components that present content to the player 112, 116 in an audible fashion (e.g., buzzers, speakers 244, headphones, etc.). The user interface device(s) 272 may also include one or more combined user input/user output devices (e.g., a touch-sensitive display or display panel 416 or a lighted button) without departing from the scope of the present disclosure. In the example of FIG. 4B, the display 404 may include a touch-sensitive display, in which case the display 404 can be used to present GUI elements as well as soft buttons 420.

The speakers 244 may be provided as a single speaker or as part of a speaker array for producing audible sounds or outputs for the player 112, 116. In some embodiments, the speakers 244 of a speaker array may be coordinated or selectively activated by the speaker management instructions 220. In some embodiments, the speaker management instructions 220 may be configured to detect a position of a player 112, 116 relative to the gaming device 108 or relative to the speakers 244 and then may select appropriate speakers from the speaker array for outputting gameplay audio and/or shared audio content. In some embodiments, the speakers 244 may be controlled in such a way that a directed sound beam is produced and delivered to a particular player 112, 116 of the gaming device 108. A directed sound beam, in some embodiments, may be produced by the speaker management instructions 220 employing one or more sound cards or drivers to activate selected speakers 244 in the speaker array. In some embodiments, the speaker management instructions 220 may be configured to utilize eye tracking and/or head tracking technologies to determine which of the speakers 244 to activate and which to deactivate in connection with producing a particular sound beam. Examples of such eye tracking and head tracking technologies are further described in U.S. patent application Ser. No. 15/707,639 filed on Sep. 18, 2018. As an example, the speaker management instructions 220 may be configured to split an audio output of the game instructions 208 into a first audio output and a second audio output. The first audio output may be aimed to a first region positioned in proximity of the user interface and the second audio output may be aimed to a second region positioned in proximity of the user interface, where at least some of the first region does not overlap with at least some of the second region. In other words, a first player may be provided with a first audio output while a second player is provided with a second audio output even though both players are seated in front of the gaming device 108. As an example, the first audio output for the first player may be generated based on a preference of the first player (e.g., a volume or game sound preference) whereas the second audio output for the second player may be generated based on a preference of the second player (e.g., a different volume or game sound preference).

The reader 248 may be configured to read credentials of different types. For instance, the reader 248 may be configured to read the mobile device 124 or other credentials that operate with a defined protocol or utilize an expected data format. The format or form factor of a credential carried by the player 112, 116 should not be limited to any particular type of format or form factor. Examples of suitable form factors that may be as a credential include, without limitation, magstripe cards, chip-based cards, contactless/wireless cards, key fobs, mobile devices 124, optically-readable cards, or the like. It should be appreciated that a user's 112 credential may be capable of being read by a reader 248 when brought within a predetermined distance of the reader 248 (e.g., if the reader 248 includes an antenna and is utilize a contactless communication protocol like Near Field Communications (NFC) or Bluetooth). Alternatively or additionally, a credential may be capable of being read by a reader 248 when inserted to a slot of a card reader 248 or swiped through a card reader 248. To the extent that the form factor of a credential can vary and is not limited, it should be appreciated that the reader 248 may be provided with any number of hardware and/or software components to enable interactions with a credential. More specifically, each a reader 248 may include one or multiple readers, each of which may be provided with appropriate hardware and/or software components to enable the reader 248 to extract/read data that is stored on a credential and/or mobile device 124.

The reader 248 may be considered a type of sensor 240 that is used to detect whether one or multiple players 112, 116 are positioned within the predetermined proximity 128 of the gaming device 108. For instance, if multiple players 112, 116 card-in to participate in a gaming session at substantially the same time, then the player detection instructions 212 may determine, based on the inputs received from the reader 248, that multiple players 112, 116 are desiring to play the gaming device 108 at the same time. Other types of sensors 240 may be used to detect a presence of one or multiple players at the gaming device 108. Examples of devices that are suitable for use as a sensor 240 include, without limitation, an optical sensor (e.g., a camera, an infrared sensor, a proximity sensor, etc.), a pressure sensor, a heat sensor, an inductive sensor, etc. As shown in FIGS. 4A and 4B, the sensors 240 may be provided in the gaming device 108 (e.g., as embedded sensors), may be attached to the gaming device 108 (e.g., as peripheral devices), and/or may be physically distanced from the gaming device 108. For instance, the gaming device 108 may include a cabinet 402 or similar support structure on which a sensor 240 is mounted. There may also be a bench 424 or shared seating device that is positioned in front of the gaming device 108 and the bench 424 may be provided with one or more sensors 240 that can detect whether a single player or multiple players are sitting on the bench 424. One or more of the sensors 240 may provide sensor data to the player detection instructions 212 that enable the player detection instructions 212 to determine whether one, two, three, or more players are positioned in front of the gaming device 108 and/or are actively playing the gaming device 108. In some embodiments, the sensor data provided to the player detection instructions 212 may enable the player detection instructions 212 to detect that multiple players are positioning in proximity of the user interface 272 as well as determine a distance of each player from the user interface 272. The player detection instructions 212 may alternatively or additionally be configured to determine a position of one or more players in a three-dimensional space relative to the user interface 272. For example, the player detection instructions 212 may be configured to determine a distance and position of one, some, or all players 112, 116 within a room and relative to the user interface 272. If multiple players 112, 116 are detected as being within reach of the user interface, then the player detection instructions 212 may modify the game instructions 208 and/or invoke certain player attraction features from the player attraction instructions 216.

In some embodiments, the sensor(s) 240 may be configured to detect and/or verify which input has been performed by a particular player 112, 116. For instance, the sensor(s) 240 may include one or more proximity sensors, gesture sensors, or the like that are configured to verify which player provided a particular input and the input could correspond to a mid-air gesture and/or a pressing of a button 420 by a player 112, 116.

Game Management System

Figure 3:
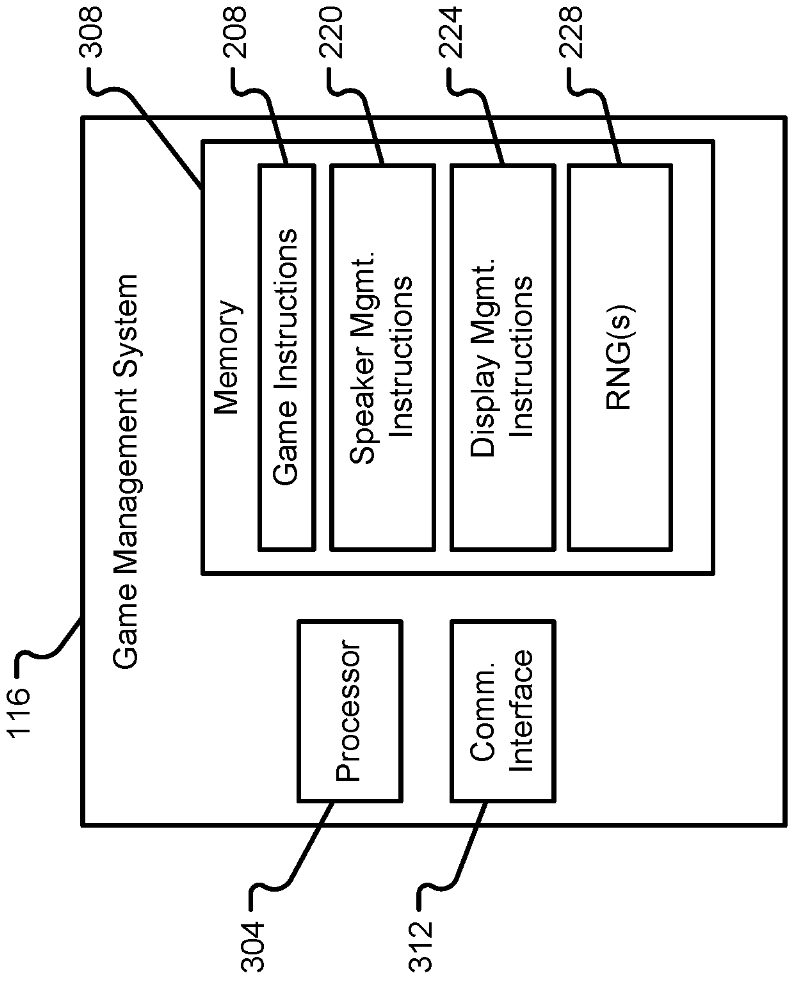
FIG. 3 is a block diagram depicting details of a game management system for enabling multi-player use of a gaming device in accordance with embodiments of the present disclosure.

With reference now to FIG. 3, additional details of a game management system 120 will be described in accordance with at least some embodiments of the present disclosure. The game management system 120 may include a distributed computing architecture (e.g., a plurality of servers). Some or all of the servers in the game management system 120 may be configured with similar components, instructions, code sets, or the like, which means that the game management system 120 may correspond to a distributed and highly-available system in which one or more servers act to backup other servers. Alternatively or additionally, the servers of the game management system 120 may be configured for parallel data processing capabilities.

Although details of a game management system 120 are shown in FIG. 3 as being provided in a single device, it should be appreciated that multiple devices (e.g., multiple servers) may be provided with similar or identical components. Alternatively, some components depicted in FIG. 3 may be provided in one server whereas other components may be provided in another server. For illustrative purposes, a game management system 120 may include a processor 304, memory 308, and a communication interface 312.

The processor 304 may be similar or identical to processor 236. In some embodiments, the processor 304 may include one or multiple computer processing devices. In some embodiments, the processor 304 may include a microprocessor, a CPU, a microcontroller, or the like. The processor 304 may also be configured to execute one or more instructions stored in memory 308.

The communication interface 312 may enable the game management system 120 to connect with the communication network 104. The communication interface 312 may include one or more communication ports, switches, routes, etc. that connect with a cable or the like. Alternatively or additionally, the communication interface 312 may include an antenna and/or a driver for the antenna that enables the game management system 120 to wirelessly communicate with other devices.

The memory 308 may be similar or identical to other memory devices depicted and described herein. For instance, the memory 308 may be similar or identical to machine memory 204. The memory 308 may include one or more volatile or non-volatile memory devices that are configured to store instructions for execution by the processor 304. Alternatively or additionally, the memory 308 may be configured to store other data to be used in connection with providing game management functions for the gaming devices 108. The illustrative types of instructions that may be stored in memory 308 include, without limitation, game instructions 208, the speaker management instructions 220, and/or the display management instructions 224. The memory 308 is also shown to include the RNG(s) 228, though it should be appreciated that functionality of an RNG 320 may be provided by the processor 304 without executing instructions from memory. Rather, the RNG 320 may correspond to a particular routine that is natively built into the processor 304 and/or that relies on a clock of the processor 304 for generating a random or pseudo random output when called. Alternatively or additionally, the RNG 320 may be provided as part of game instructions 208 and/or game instructions 208 of a gaming device 108.

Player Interactions

Figure 5:
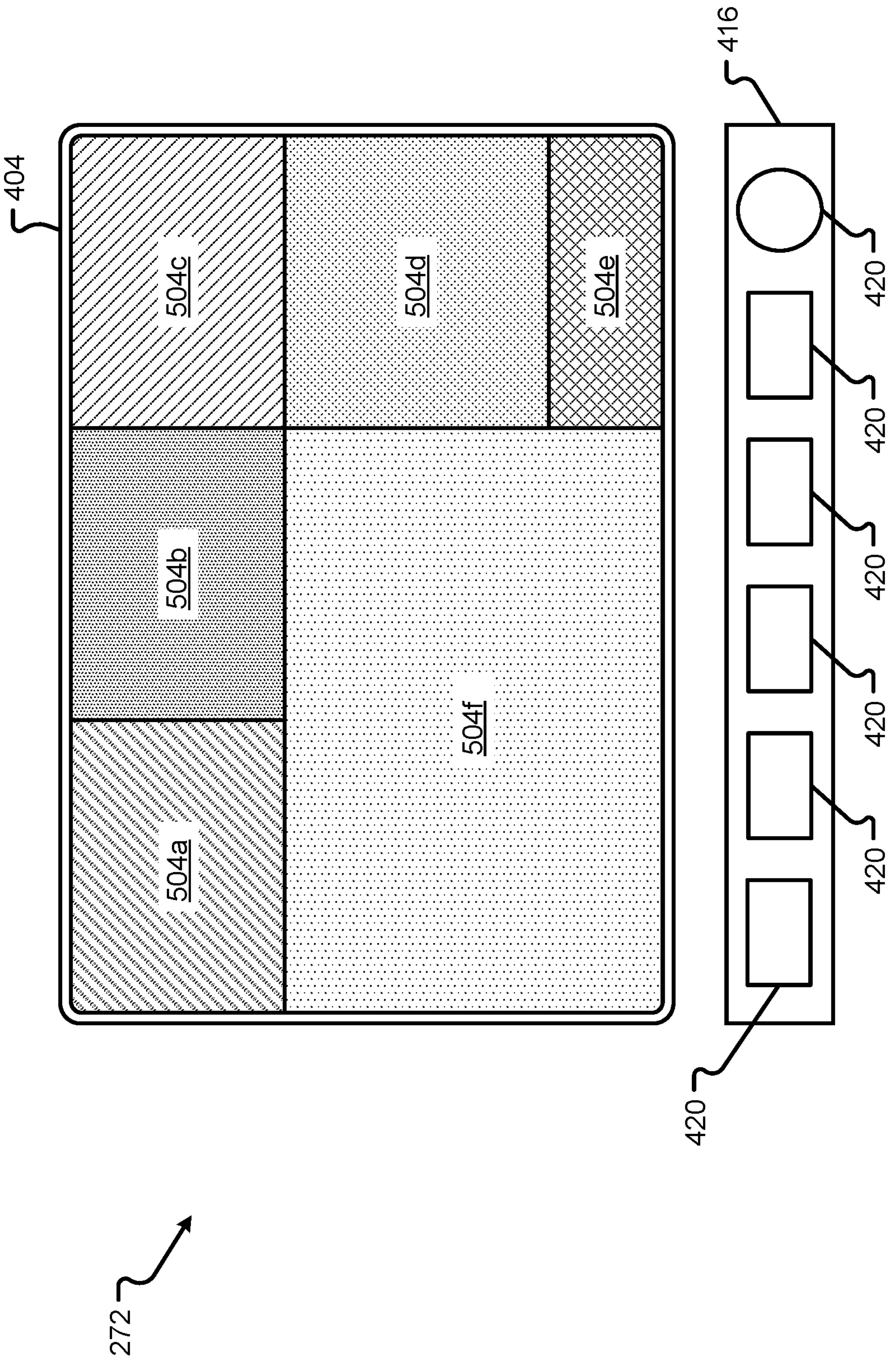
FIG. 5 is a diagram depicting a user interface including a display device and user input devices in accordance with embodiments of the present disclosure.
Figure 6A:
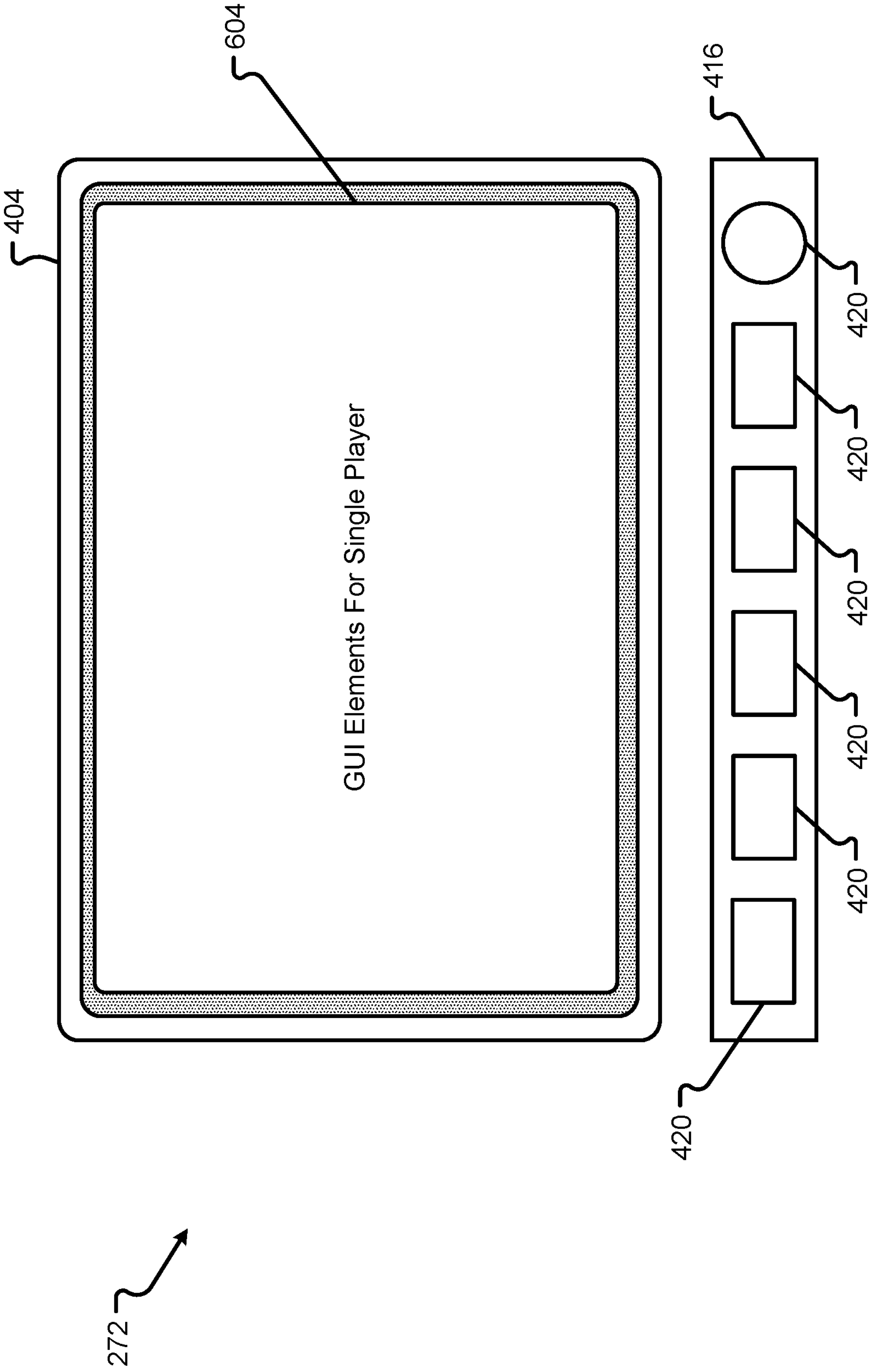
FIG. 6A illustrates a first configuration of a user interface showing Graphical User Interface (GUI) elements for a single player in accordance with embodiments of the present disclosure.
Figure 6B:
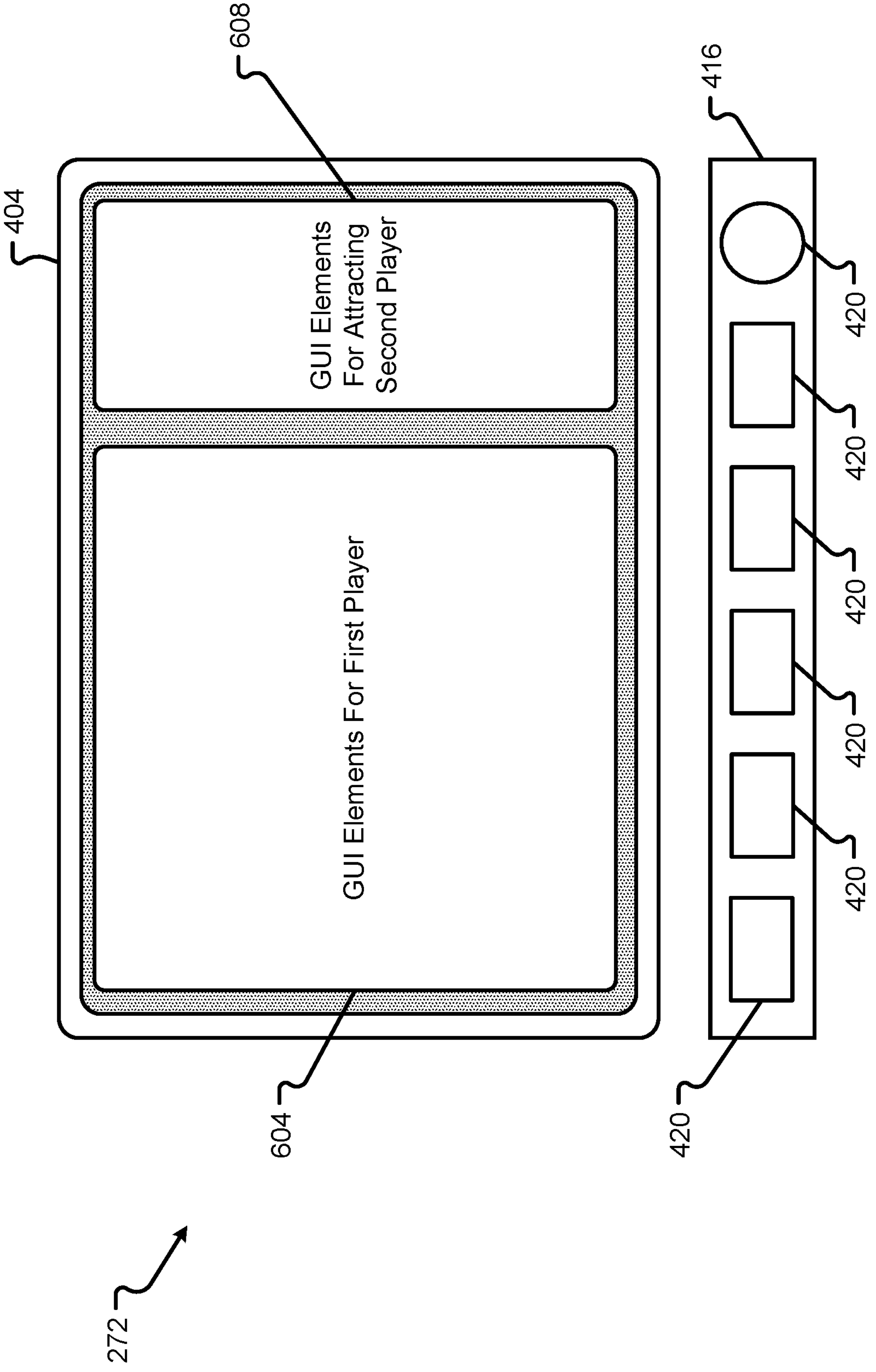
FIG. 6B illustrates a second configuration of a user interface showing GUI elements for a first player along with GUI elements for attracting a second player in accordance with embodiments of the present disclosure.
Figure 6C:
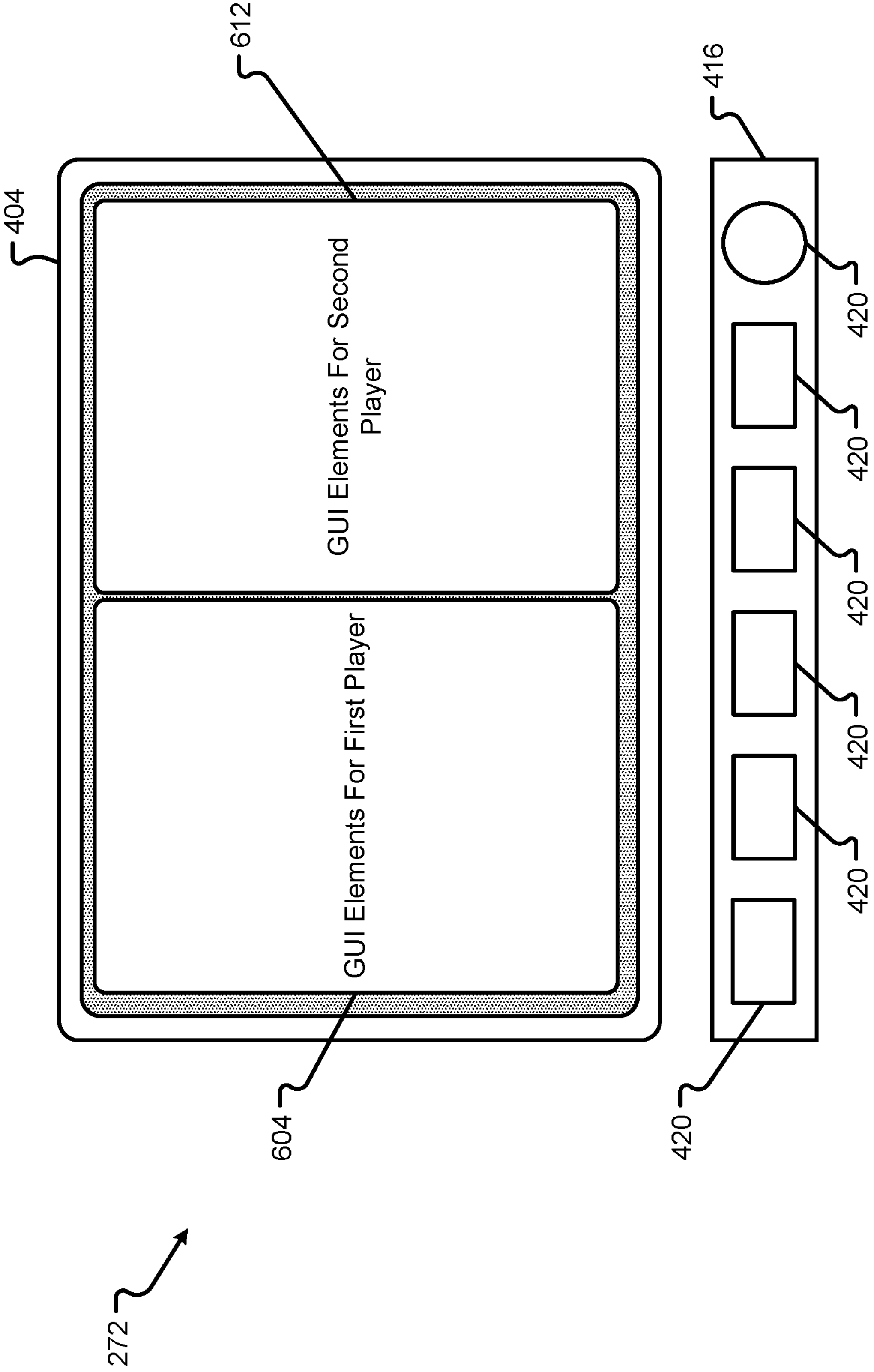
FIG. 6C illustrates a third configuration of a user interface showing GUI elements for a first player and a second player in accordance with embodiments of the present disclosure.
Figure 6D:
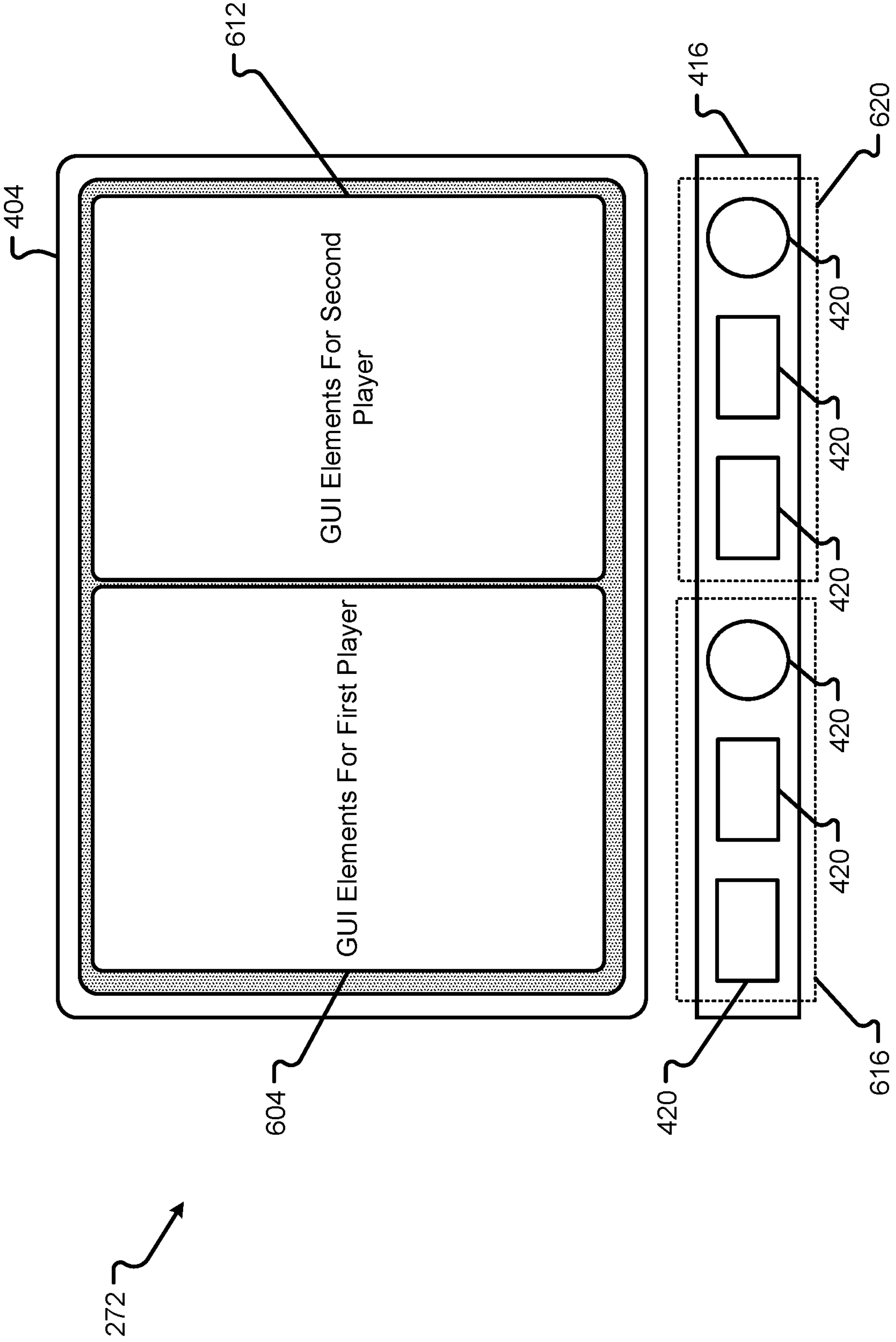
FIG. 6D illustrates a fourth configuration of a user interface showing GUI elements for a first player and a second player along with a reconfigured set of user input devices in accordance with embodiments of the present disclosure.
Figure 6E:
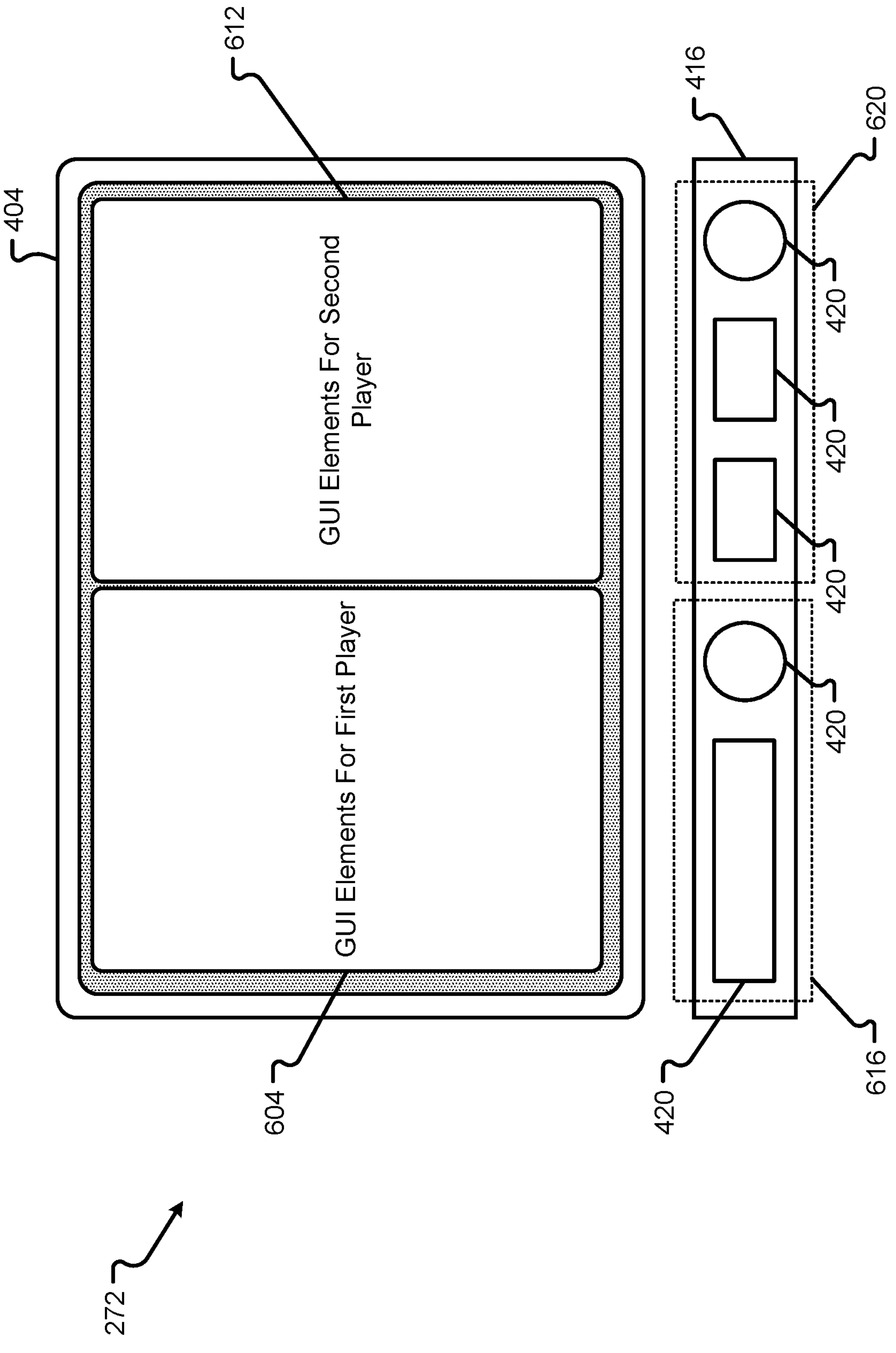
FIG. 6E illustrates a fifth configuration of a user interface showing GUI elements for a first player and a second player along with a reconfigured set of user input devices in accordance with embodiments of the present disclosure.
Figure 6F:
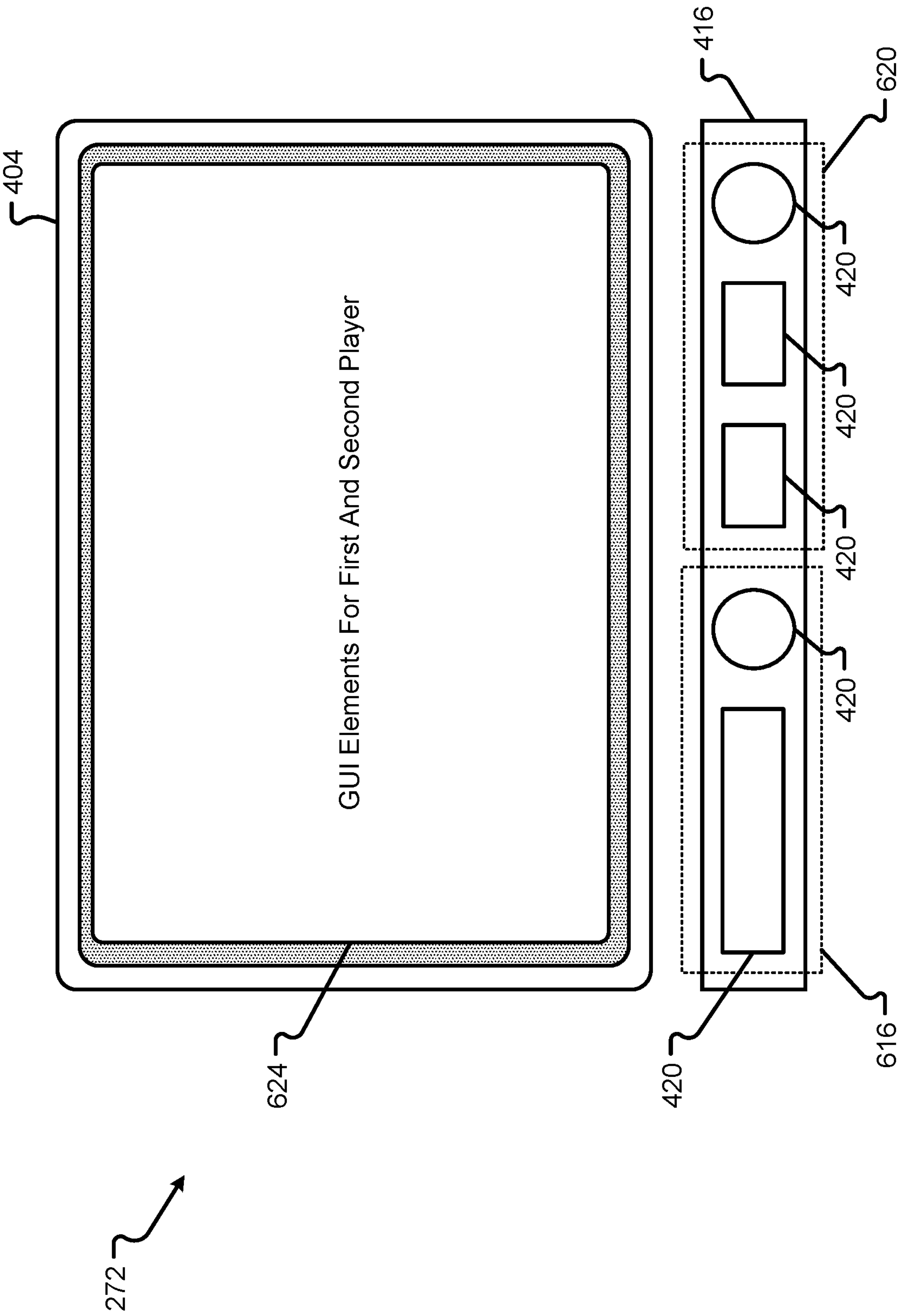
FIG. 6F illustrates a sixth configuration of a user interface showing GUI elements shared between a first player and a second player along with separate user input devices for the first player and the second player in accordance with embodiments of the present disclosure.
Figure 6G:
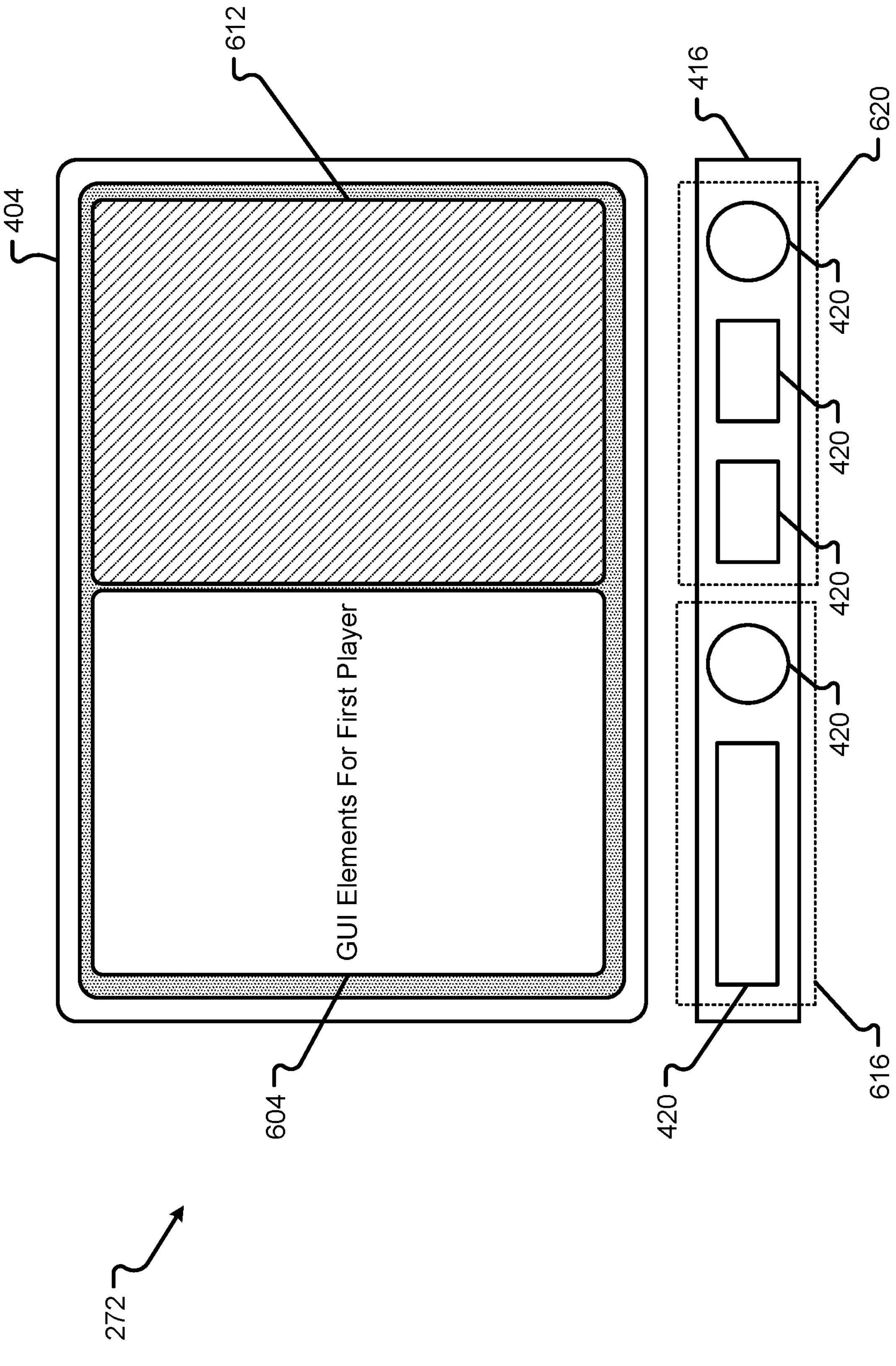
FIG. 6G illustrates a seventh configuration of a user interface showing GUI elements for a second player obfuscated from view of a first player in accordance with embodiments of the present disclosure.

With reference now to FIGS. 5 through 6G, additional configurations of a gaming device 108 that support single player and multi-player interactions will be described in accordance with at least some embodiments of the present disclosure. Referring initially to FIG. 5, additional details of a user interface 272 will be described in accordance with at least some embodiments of the present disclosure. The user interface 272 is shown to include a display device 404, which may be in the form of a display screen that solely provides display functions or in the form of a touch-sensitive display screen (e.g., a device that provides display functions and that receives user inputs). The user interface 272 is also shown to include the button panel 416, which displays one or more touch sensitive areas as soft buttons 420. As will be described herein, the type and/or number of buttons presented by the button panel 416 may change depending upon whether one, two, three, or more players 112, 116 are detected within proximity of the gaming device 108. For instance, a first configuration of buttons 420 may be presented by the button panel 416 when a single player is detected whereas a second configuration of buttons may be presented by the button panel 416 when multiple players are detected. The configuration of buttons 420 provided by the button panel 416 may also change depending upon whether one, two, three or more different players are detected as actively playing the gaming device (e.g., rather than just observing activities of another player).

The display device 404 may also be configured to present different content (e.g., GUI elements, gameplay graphics, information, etc.) in different configurations depending upon the number of players detected in proximity of the gaming device 108. The display device 404 is shown to include a number of different presentation regions 504*a*, 504*b*, 504*c*, 504*d*, 504*e*, and 504*f*. These different presentation regions 504*a-f* may be configured to presented different content depending upon whether the game instructions are implementing a single player mode of operation or a multi-player mode of operation. In some embodiments, all presentation regions 504*a-f* may be used to present content in a unified manner (e.g., in a single player mode or in mode where multiple players are interacting with the same game). In some embodiments, some presentation regions 504*a-f* may be configured to present content for one player while other presentation regions 504*a-f* may be configured to present content for another player. The different contents displayed to different players may be customized for each player's preferences, based on different games played by each player, based on whether one player is actively playing the gaming device 108 whereas another player is not actively playing the gaming device 108, etc. The display management instructions 224 may be configured to control the content displayed via the display device 404 and which region is used to display a certain content. Transitions from various configurations depicted and described herein may be achieved using any number of transitioning techniques (e.g., screen slides, rotations, swipes, splits, zoom in, zoom out, etc.).

With reference to FIG. 6A, a first configuration of the user interface 272 is shown. In this particular configuration, GUI elements for a single player 604 are displayed via the display device 404. The GUI elements for the single player 604 may include gameplay graphics if a single player is interacting with the game instructions 208 (e.g., if a player is involved in a gaming session). The GUI elements for the single player 604 may include content that is intended to attract a single player or multiple players to the gaming device 108. The GUI elements for the single player 604 may include gameplay graphics that are generated based on game outcomes provided by the game instructions 208 that are implementing a set of single player game rules.

FIG. 6B illustrates a second configuration of the user interface 272 where the GUI elements for the first player 604 are presented by a portion of the display device 404 and where GUI elements for attracting a second player 608 are presented by another portion of the display device 404. In this configuration, some of the presentation regions 504*a-f* may be used to generate and display the GUI elements for the first player 604 whereas other presentation regions 504*a-f* may be used to generate and display the GUI elements for attracting the second player 608.

In some embodiments, display management instructions 224 may be configured to dynamically change the display of content from the first configuration (e.g., the configuration shown in FIG. 6A) to the second configuration (e.g., the configuration shown in FIG. 6B) in response to the player detection instructions 212 detecting a second player in proximity of the gaming device while a first player is actively engaged in a gaming session. In other words, the content displayed by the display device 404 may change from presenting the GUI elements for the first player 604 to the configuration where the GUI elements for attracting the second player 608 are presented alongside the GUI elements for the first player 604. During the transition from the first configuration to the second configuration, the aspect ratio of the GUI elements for the first player 604 may or may not change to accommodate the presentation of the GUI elements for attracting the second player 608. Furthermore, the content of the GUI elements for the first player 604 may be provided by outputs of the game instructions 208 whereas content of the GUI elements for attracting the second player 608 may be provided by outputs of the player attraction instructions 216.

The GUI elements for the first player 604 may include game outcomes generated by the game instructions 208 based on the game instructions applying game rules to user inputs. If the player is playing a game of chance, then the game outcome may be based on one or more random numbers generated by the RNG(s) 228. The content of the GUI elements for attracting the second player 608 may include information content that describes advantages associated with a second player joining the first player's gaming session or that describes advantages associated with the second player engaging in a gaming session substantially simultaneous with the first player's gaming session. Such advantages may include additional game outcomes, additional or different game features, different payout opportunities, different odds, different game rules that will be made available to the first player already involved in the gaming session, increased credit opportunities for the first and/or second player, different bonus options, different wager opportunities, different player loyalty benefits, different types of games that can be played by the different players, etc.

The GUI elements for attracting the second player 608 may be presented in a smaller portion of the display device 404 as compared to the portion of the display device 404 used to present the GUI elements for the first player 604. Although depicted as being side-by-side, it could be appreciated that the GUI elements for attracting the second player 608 may be overlaid, partially or completely, on top of the GUI elements for the first player 604. In other words, it may be possible to use a single presentation region to display both the GUI elements for the first player 604 as well as GUI elements for attracting the second player 608.

FIG. 6C illustrates a third configuration of the user interface 272 where the GUI elements for the first player 604 are presented by a portion of the display device 404 and where GUI elements for the second player 612 are presented by another portion of the display device 404. In this configuration, some of the presentation regions 504*a-f* may be used to generate and display the GUI elements for the first player 604 whereas other presentation regions 504*a-f* may be used to generate and display the GUI elements for the second player 612. Although depicted as being side-by-side, it is possible to overlay some or all of the GUI elements for the first player 604 with the GUI elements for the second player 612.

In this configuration, the display device 404 can be used to present a first game instance with the GUI elements for the first player 604 and a second game instance with the GUI elements for the second player 612. This particular configuration may be utilized when two or more players are detected as being in proximity of the gaming device 108. More specifically, this particular configuration may be utilized when two or more players are detected within proximity of the gaming device 108 and are actively engaging with the game instructions 208 (e.g., playing the gaming device 108). In some embodiments, the GUI elements for the second player 612 may include additional gameplay graphics that are not rendered in the GUI elements for the first player 604. More specifically, some gameplay graphics displayed in the GUI elements for the first player 604 may be different from the gameplay graphics displayed in the GUI elements for the second player 612. The gameplay graphics displayed in the GUI elements for the first player 604 may be generated based on first game outcomes provided by the game instructions 208 whereas the gameplay graphics displayed in the GUI elements for the second player 608 may be generated based on second game outcomes provided by the game instructions 208. Alternatively or additionally, both the first and second player may interact with a common game and have shared game outcomes. Gameplay graphics representing the shared game outcomes may be presented redundantly to both the first player and second player by the GUI elements for the first player 604 and the GUI elements for the second player 612.

The display management instructions 224 may transition the display device 404 to this third configuration from any of the other configurations depicted and described herein. For instance, the display device 404 may transition from the first configuration (e.g., as shown in FIG. 6A) to the third configuration (e.g., as shown in FIG. 6C). Alternatively, the display device 404 may transition from the second configuration (e.g., as shown in FIG. 6B) to the third configuration (e.g., as shown in FIG. 6C).

FIG. 6D illustrates a fourth configuration of the user interface 272 where the GUI elements for the first player 604 are presented by a portion of the display device 404 and where GUI elements for the second player 612 are presented by another portion of the display device 404. This configuration also shown a modification to the button panel 416 to support the multi-player interactions.

In this particular configuration, the button panel 416 is reconfigured to present a first set of buttons 616 for a first player (e.g., to receive first player input) and a second set of buttons 620 for a second player (e.g., to receive second player input). In some embodiments, inputs received at the first set of buttons 616 may be used to control the game played by the first player. Specifically, inputs received at the first set of buttons 616 may be provided as first inputs to a first game instance and may be used to produce a first game outcome that is displayed in the GUI elements for the first player 604. Inputs received at the second set of buttons 620 may be used to control the game played by the second player. Specifically, inputs received at the second set of buttons 620 may be provided as second inputs to a second game instance and may be used to produce a second game outcome that is displayed in the GUI elements for the second player 612.

Switching the button panel 416 from one configuration to another may include changing a number of buttons 420 provided on the button panel 416. Switching the button panel 416 from one configuration to another may include changing the types of buttons 420 that are provided on the button panel 416. In some embodiments, the types of buttons 420 provided in the first set of buttons 616 may be the same as the types of buttons 420 provided in the second set of buttons 620. In other words, at least one type of button (e.g., a bet button, a max bet button, a spin button, a payline selection button, a cash out button, etc.) may be redundantly provided in the first set of buttons 616 and the second set of buttons 620. Alternatively as shown in FIG. 6E, the first set of buttons 616 may have a different number of buttons 420 than the second set of buttons 620. As an example, a first player 112 may be provided with a first set of input options via the first set of buttons 616 whereas a second player 116 may be provided with a second set of input options via the second set of buttons 620.

It may also be possible to enable the first player 112 and/or second player 116 to provide inputs to a common game. In other words, the game instructions 208 may be configured to process inputs from the first set of buttons 616 and second set of buttons 620 for a single game instance. In other embodiments, the game instructions 208 may be configured to segregate inputs from the first set of buttons 616 and second set of buttons 620 such that inputs received at the first set of buttons 616 are only used to produce game outcomes for the first player 112, which results in a change of the GUI elements for the first player 604, while inputs received at the second set of buttons 620 are only used to produce game outcomes for the second player 116, which results in a change of GUI elements for the second player 612.

FIG. 6F illustrates yet another configuration of the user interface 272 where GUI elements for the first and second player 624 are presented in a common region of the display 404. Specifically, some or all of the display 404 may be dedicated to displaying the GUI elements for the first and second player 624. In this configuration, inputs received at the first set of buttons 616 and second set of buttons 620 may both be used to control a single game and may both be used by the game instructions 208 to produce a common game outcome. The display 404 may transition to the configuration of FIG. 6F from any of the other configurations depicted and described herein.

FIG. 6G illustrates still another possible configuration of the user interface 272 where at least some of the GUI elements for the second player 612 are obfuscated (partially or completely) from view by the first player 112. In some embodiments, light filtering techniques (e.g., selective light polarizers, selective light filters, etc.) may be used in the display 404 to prevent an off-axis viewing of content displayed in either of the GUI elements for the first player 604 or the GUI elements for the second player 612. Thus, in some embodiments, outputs displayed in one portion of the display 404 may only be viewable by the player sitting directly in front of that section of the display 404. As an example, the second player 116 sitting on the right side of the display 404 may be able to view the content of the GUI elements for the second player 612 while not clearly being able to view the content of the GUI elements for the first player 604. Conversely, the first player 112 sitting on the left side of the display 404 may be able to view the content of the GUI elements for the first player 604 while not clearly being able to view the content of the GUI elements for the second player 612.

While FIG. 6G illustrates a partial or complete obfuscation of the GUI elements in the display 404, it should be appreciated that one, some, or all of the buttons 420 shown in the button 416 may be obfuscated as well. In other embodiments, it may be possible to partially or completely obfuscate only certain GUI elements that are considered sensitive (e.g., bet amount, available credit, paylines being played, etc.) while other GUI elements that are not considered sensitive may be displayed for all players to view. Obfuscation may be performed as a default action or based on player preferences.

Methods

With reference now to FIGS. 7-11, various methods will be described in accordance with at least some embodiments of the present disclosure. It should be appreciated that the disclosed methods may be performed by one, some, or all of the devices depicted and described herein. Said another way, any device within the system 100 may be used to perform some or all of a method depicted and described herein. Moreover, although certain steps are depicted as being performed in a certain order or in connection with a particular method, it should be appreciated that any method step depicted and described herein may be performed in combination with any other method step depicted and described herein.

Figure 7:
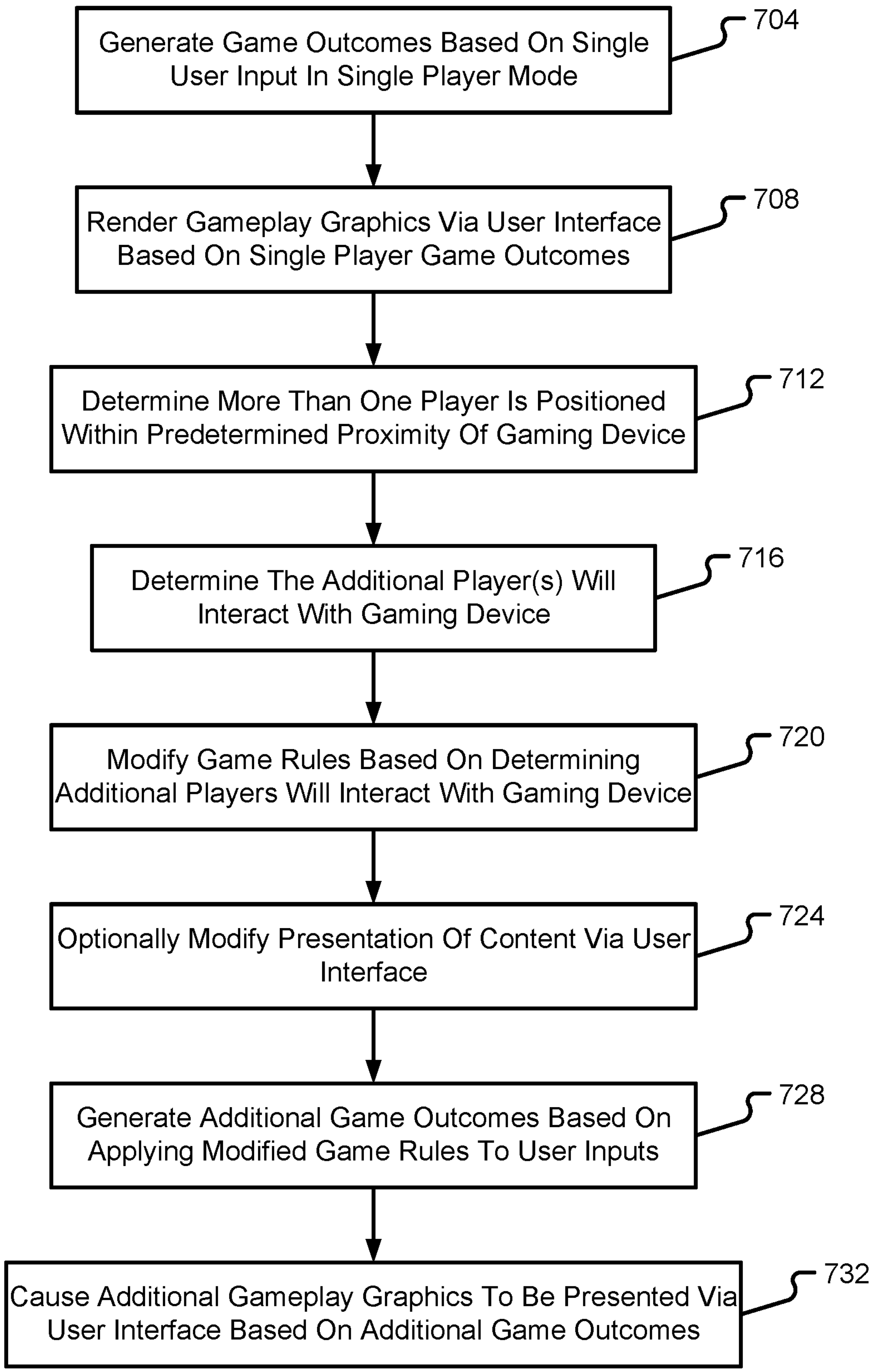
FIG. 7 is a flow diagram depicting a method of enabling multi-player use of a gaming device in accordance with embodiments of the present disclosure.

Referring initially to FIG. 7, a method of enabling multi-player use of a gaming device 108 will be described in accordance with embodiments of the present disclosure. The method begins when a single player 112 is interacting with a gaming device 108 and playing a game provided on the gaming device 108 (step 704). During this step, the gaming device 108 may utilize the game instructions 208 to apply game rules to inputs received from the player 112. Based on the inputs received from the player 112 and, based on one or more random numbers generated by a RNG 228 (e.g., if playing a game of chance), the game instructions 208 may produce game outcomes.

The game instructions 208 may provide information describing the game outcomes to the display management instructions 224, which cause gameplay graphics to be rendered by the user interface 272 (step 708). The gameplay graphics may be presented as GUI elements for the first player 604 using some or all of the display 404. Additionally, audio outputs may be produced by the speakers 244 based on the game outcomes.

The method may continue with the player detection instructions 212 receiving sensor data from one or more sensors 240. Based on the received sensor data, the player detection instructions 212 may determine that more than the first player 112 is positioned within the predetermined proximity 128 of the gaming device 108 (step 712). This determination may be made based on sensor data from a single sensor 240 or based on sensor data from multiple sensors 240. This determination may also be made based on a second player 116 interacting with the user interface 272 and/or presenting a player credential (e.g., card, mobile device 124, etc.) to a reader 248 of the gaming device 108.

The method may then continue with the player detection instructions 212 determining that the additional player 116 will also interact with the gaming device 108 (step 716). In some embodiments, this determination is made based on additional information received from sensors 240. In some embodiments, this determination is made when the second player 116 presses a particular button 420 or input affirming a desire to play the gaming device 108 at the same time as the first player 112. In some embodiments, this determination is made when the second player 116 presents a player credential or otherwise logs into the game management system 120 to initiate a gaming session.

The method may then continue with the player detection instructions 212 providing an input to the game instructions 208 indicating that another player will play on the gaming device 108. Upon receiving information from the player detection instructions 212 indicating that another player will play on the gaming device 108, the game instructions 208 may modify one or more game rules (step 720). In this step, the game instructions 208 may modify game rules for a single game to be played by both players 112, 116. Alternatively or additionally, the game instructions 208 may modify game rules for the game being played by the first player 112 while simultaneously starting a second game instance for the second player 116. For example, when the second player 116 joins and plays substantially simultaneous with the first player 112, the first player 112 may be provided additional game options or features based on the modified game rules. Examples of such modifications to the game rules include, without limitation, modified pay tables, modified odds, modified bonus opportunities, modified user inputs, modified graphics, new games or game features, new game symbols, etc.

The method may also include an optional step of modifying a presentation of content via the user interface 272 (step 724). The various types of modifications to the user interface 272 were shown and described in connection with FIGS. 6A thru 6G. Modifications to the presentation of content may also include modifications to a presentation of audio content. Other modifications to the user interface 272 may include presenting the GUI elements for the first player 604, but with additional features made possible because of the modified game rules.

The method may then proceed with the game instructions 208 responding to inputs from the first player 112 and second player 116. Based on the inputs from the players 112, 116, the game instructions 208 may generate additional game outcomes that are different from the game outcomes produced when the first player 112 was the only active player using the gaming device (step 728). The additional game outcomes may be provided to the display management instructions 224, which results in additional gameplay graphics being presented via the user interface 272 (step 732). In some embodiments, the additional gameplay graphics may be presented via the GUI elements for the first player 604 and/or via GUI elements for the second player 612.

Figure 8:
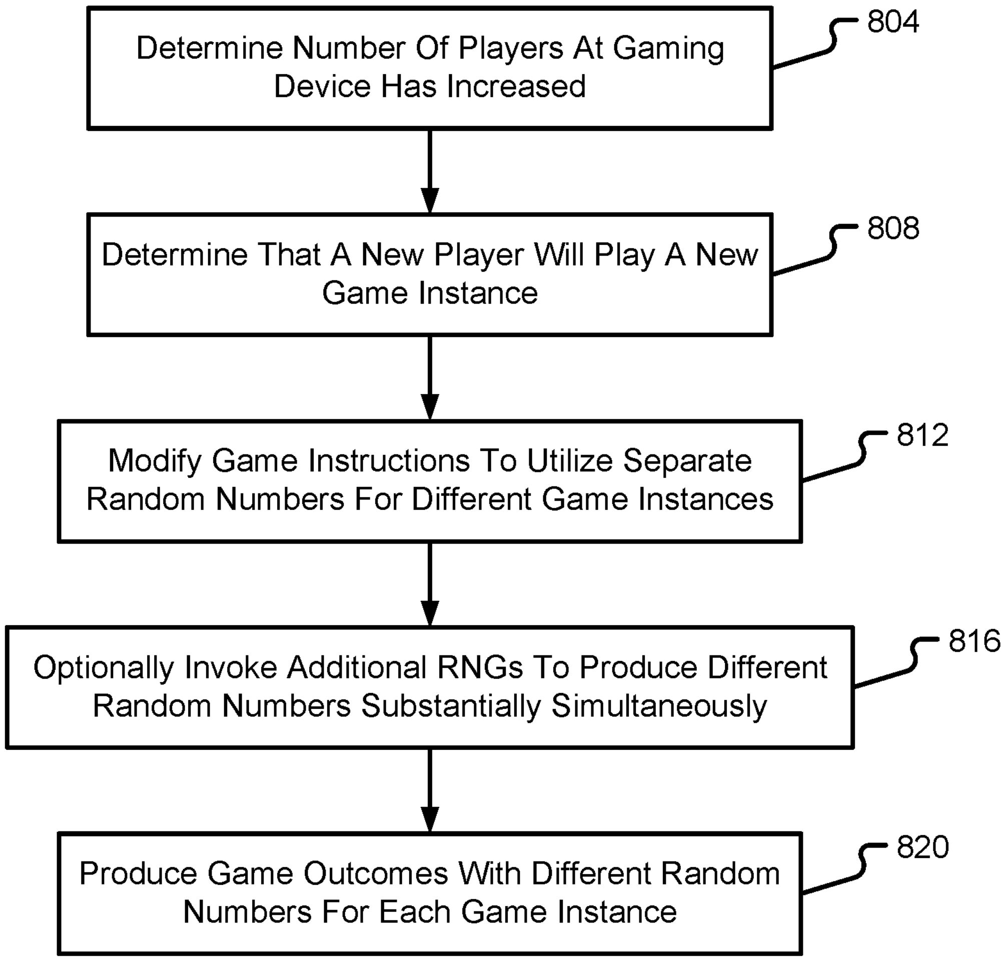
FIG. 8 is a flow diagram depicting a method of utilizing one or more Random Number Generator (RNGs) to facilitate multi-player use of a gaming device in accordance with embodiments of the present disclosure.

Referring now to FIG. 8, a method of utilizing one or more RNGs 228 to facilitate multi-player use of a gaming device 108 will be described in accordance with embodiments of the present disclosure. The method begins with the player detection instructions 212 determining that a number of players using the gaming device 108 has increased (step 804). For instance, the player detection instructions 212 may determine that the number of players using the gaming device 108 has increased from one to two or from two to three. The determination may be made based on sensor data received from one or more sensors 240 positioned on or around the gaming device 108.

The method continues with the player detection instructions 212 determining that a new player will play a new game instance (step 808). Based on determining that the new player will play a new game instance, the game instructions 208 may be modified (or rules used by the game instructions may be modified) which cause the game instructions 208 to need more than one random number to generate different game outcomes for each game instance (step 812). When the game instructions 208 determine that more than one random number will be used to support the simultaneous play of more than one player 112, 116, the game instructions 208 may optionally invoke additional RNGs 228 to produce different random number substantially simultaneously (step 816). Alternatively, the game instructions 208 may utilize a single RNG 228 that produces multiple random numbers to be used by the game instructions 208 to produce different game outcomes (step 820). In some embodiments, the game outcomes for each game instance may also vary based on the different inputs received from the different players 112, 116. Thus, the game instructions 208 may be dynamically modified to facilitate multiple games being played at substantially the same time. In other words, the game instructions 208 may be configured to transition from a single player mode to a multi-player mode based on the player detection instructions 212 determining that the number of players at the gaming device 108 has increased.

Figure 9:
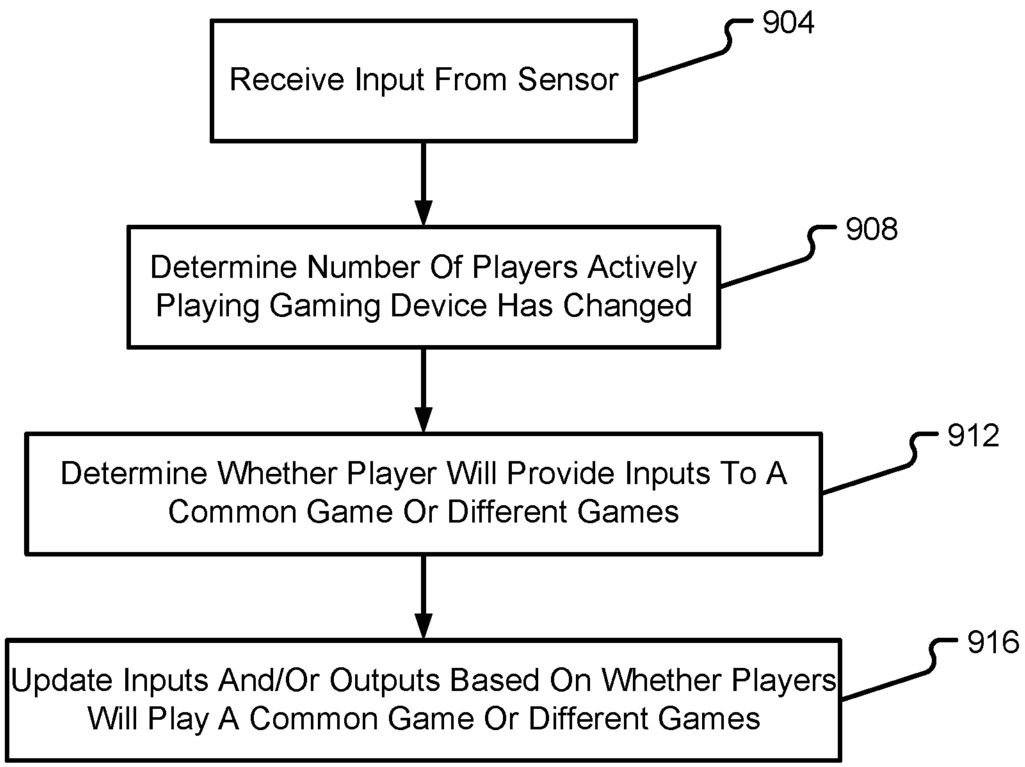
FIG. 9 is a flow diagram depicting a method of modifying aspects of a user interface to transition between single player use and multi-player use in accordance with embodiments of the present disclosure.

Referring now to FIG. 9, a method of modifying aspects of a user interface 272 to transition between single player use and multi-player use will be described in accordance with embodiments of the present disclosure. The method begins with player detection instructions 212 receiving sensor input from one or more sensors 240 in proximity of the gaming device 108 (step 904). The sensor input may include different types of sensor data depending upon the nature of the sensor 240 and the position of the sensor 240. Based on the sensor data, the player detection instructions 212 may determine that the number of players actively playing the gaming device 108 has changed (step 908). For example, the number of players may be determined to have increased from one value to a higher value.

The method may then continue by determining whether the new player will provide inputs to the gaming device 108 in addition to the player already playing the gaming device 108 (step 912). This step may also include determining whether the new player will play the same game as the existing player or whether the new player will play a different game. In ether situation, if it is determined that the new player will also provide inputs, then the game instructions 108 may cause the display management instructions 224 to change inputs and/or outputs provided by the user interface 272 (step 916). For example, the game instructions 208 may cause the number and/or type of inputs to change based on determining that more players will interact with the gaming device 108. As an example, a button panel 416 may be modified to present a greater number of buttons 420. As another example, some button types may be presented redundantly to the first player 112 and a second player 116, thereby allowing both players to provide inputs to the gaming device 108 and control different instances of games. Providing a same type of button to both players may allow each player to play their own instance of a game or may each player to interact with the same game in a similar way.

Figure 10:
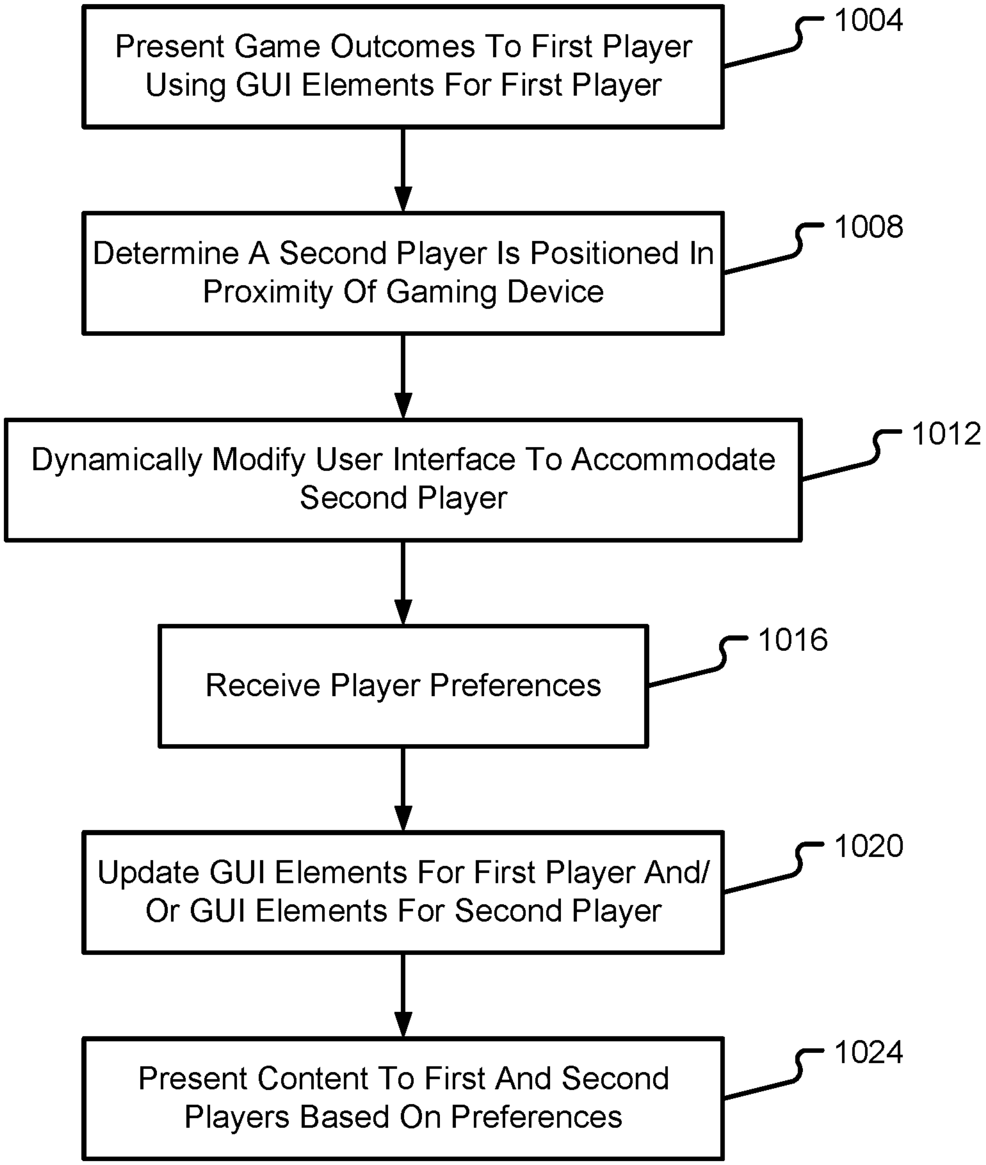
FIG. 10 is a flow diagram depicting a method of customizing display and/or audio content for multiple players using a shared gaming device in accordance with embodiments of the present disclosure.

Referring now to FIG. 10, a method of customizing display and/or audio content for multiple players using a shared gaming device 108 will be described in accordance with embodiments of the present disclosure. The method begins with the game instructions 108 requesting the display management instructions 224 to present game outcomes to a first player 112 using GUI elements for the first player 604 (step 1004). The GUI elements for the first player 604 may include icons, symbols, paylines, or the like that enable the first player 112 to interact with a first instance of a game.

The method may continue by determining that a second player 116 is positioned in proximity of the gaming device 108 (step 1008). This determination may be made based on the player detection instructions 212 processing sensor data from sensors 240 as described herein. Upon determining that a second player 116 is positioned in proximity of the gaming device 108, the display management instructions 224 may be requested to modify the user interface 272 to accommodate the second player 116 (step 1012). As an example, the user interface 272 may be modified to change content presented by the display device 404, change audio content presented by speakers 224, and/or change content displayed on a button panel 416.

The method may continue with the display management instructions 224 receiving player preferences (step 1016). The player preferences may be received from the game management system 120 or may be received directly from the player 112, 116 (e.g., via a credential, via a player profile, or based on specific inputs provided by the player 112, 116). The player preferences may include preferences for hiding or obfuscating from other players, The player preferences may include preferences for displaying or presenting content, customized skins, preferred button types, volume preferences, audio content preferences, symbol preferences, or any other preference related to a presentation of content via the user interface 272.

The method may continue by updating GUI elements for the first player 604, updating GUI elements for the second player 612, or combinations thereof (step 1020). The update to the GUI elements may cause content to be presented (or not presented) based on preferences of the first player 112 and/or second player 116 (step 1024). As an example, the step of presenting content based on preferences may include presenting a single game instance with different graphics, skins, symbols, font sizes, or the like to the different players. As another example, the step of presenting content based on preferences may include at least partially obfuscating some content such that other players cannot view the content. As another example, each player 112, 116 may be provided with customized audio content (or the same audio content may be played at different volumes) based on player preferences.

Figure 11:
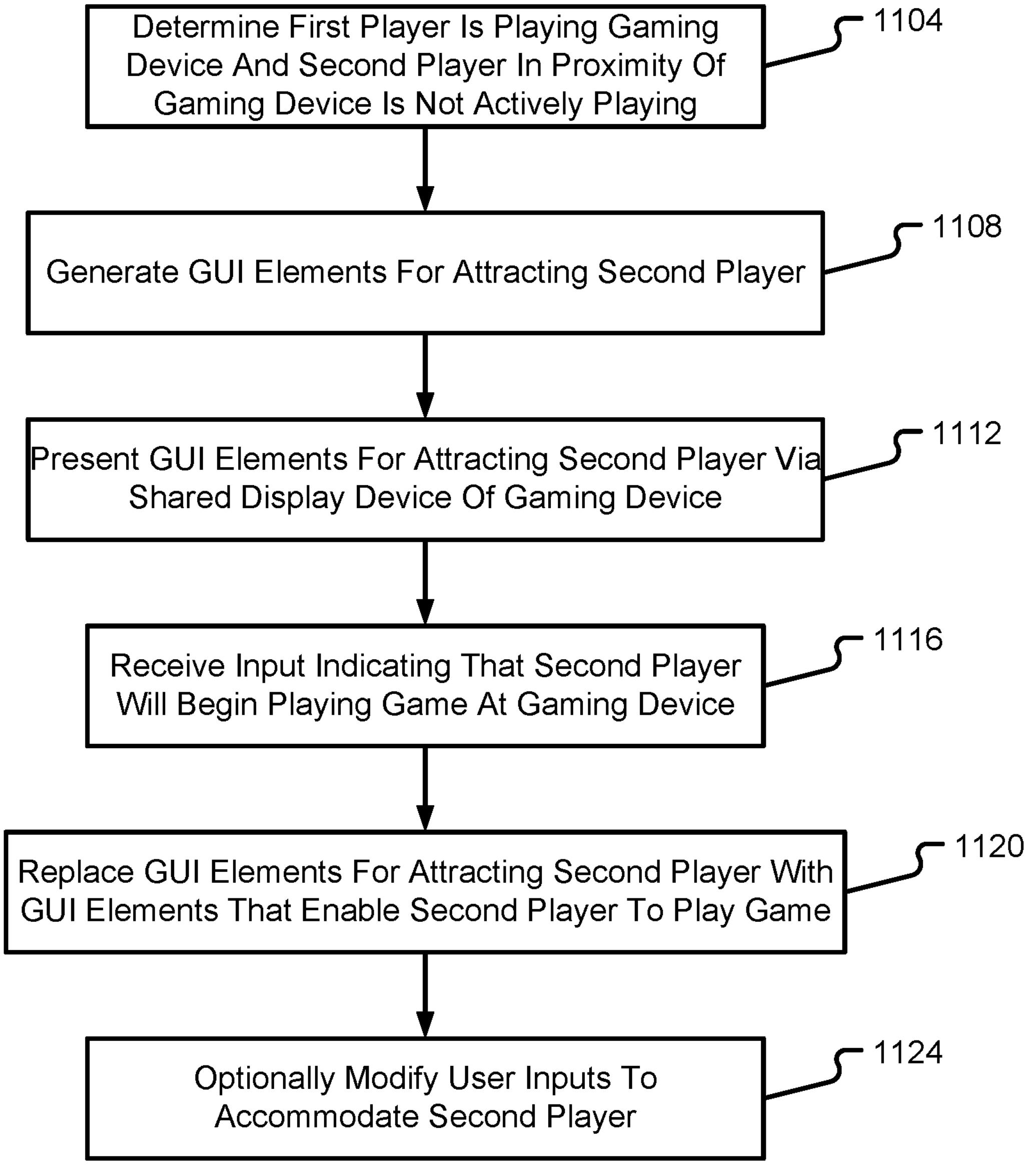
FIG. 11 is a flow diagram depicting a method of attracting a second player to play a gaming device that is currently being played by a first player in accordance with embodiments of the present disclosure.

Referring now to FIG. 11, a method of attracting a second player 116 to play a gaming device 108 that is currently being played by a first player 112 will be described in accordance with embodiments of the present disclosure. The method begins by determining that a first player 112 is playing a gaming device 108 while also determining that a second player 116 is within proximity of the gaming device 108, but is not actively playing (step 1104). This determination may be made by the player detection instructions 212 based on sensor data. As a non-limiting example, the player detection instructions 212 may determine that multiple players are seated in a bench 424, but only one of the players are actively engaging buttons 408, 420 of the gaming device 108.

Based on the determination of step 1104, the player attraction instructions 216 may be invoked to generate GUI elements for attracting the second player 608 (step 1108). The GUI elements for attracting the second player 608 may include attraction messages and graphics that describe a benefit that can be obtained if the second player 116 joins the first player 112 in playing the gaming device 108.

The GUI elements for attracting the second player 608 may be presented on top of the GUI elements for the first player 604 or may be presented side-by-side with the GUI elements for the first player 604. In some embodiments, the GUI elements for attracting the second player 608 may be incorporated in or be a part of the GUI elements for the first player 604. In some embodiments, the GUI elements for attracting the second player 608 may be presented in a portion of the display device 404 that is smaller than the portion of the display device 404 used to present the GUI elements for the first player 604.

The method may continue when an input is received indicating that the second player 116 desires to play a game at the gaming device 108 (step 1116). The input may be received from the first player 112 or the second player 116 and may be received at one of the inputs (e.g., buttons 420) presented to the first player 112. In some embodiments, the input may be received at a button 408 or some other input device provided in the gaming device 108. In some embodiments, the input may be received via the second player 116 logging into the gaming device 108 while the first player 112 is still playing a game at the gaming device 108.

Upon receiving the input in step 1116, the method may continue by replacing the GUI elements for attracting the second player 608 with GUI elements that enable the second player 116 to play a game (e.g., GUI elements for the second player 612) (step 1120). When the GUI elements for attracting the second player 608 are replaced with other GUI elements, the size of the GUI elements for the first player 604 may be modified (e.g., resized) to accommodate a size of the GUI elements for the second player 612. This step may alternatively or additionally include modifying a presentation provided to the first player 112. For example, GUI elements for the first and second player 624 may be presented via the display device 404 for both the first player 112 and second player 116 to view (e.g., a shared view of a single game instance).

In some embodiments, one or more user inputs may be modified to accommodate the second player 116 (step 1124). For instance, one or more buttons 420 on a button panel 416 may be added, removed, or replaced with other buttons or button types. In some embodiments, the user inputs may accommodate multiple players to interact with the same game or to interact with different games.

Variants

The present disclosure contemplates a number of different variants or combinations of concepts depicted and described herein. Moreover, embodiments of the present disclosure contemplate a system 100 in which multiple benches 424 positioned in front of different gaming devices 108 may be connected or linked to one another. Linking of two or more benches 424 (e.g., connecting multiple buddy seats) may provide the system 100 with an ability to facilitate multi-player versus multi-player games. For instance, two players sitting on a first bench 424 may be allowed to compete or play against two players sitting on a second bench 424. Alternatively or additionally, connecting two or more benches 424 (and the games provided by the gaming devices 108 associated therewith) may enable enhanced bonus games where one team of players (e.g., a "Red Team" sitting at a first bench 424) can team up with a second team of players (e.g., a "Blue Team" sitting at a second bench 424). The connection of these two different teams may be facilitated by having one player from each bench 424 enter a particular code or the like that enables the multiple teams of players to enter a collective bonus playoff or the like.

The present disclosure contemplates a variety of different gaming systems and environments each having one or more of a plurality of different features, attributes, or characteristics. A "gaming system" or "gaming environment" as used herein refers to various configurations of: (a) one or more central servers, central controllers, or remote hosts; (b) one or more electronic gaming machines such as those located on a casino floor; and/or (c) one or more gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more gaming devices in combination with one or more central servers, central controllers, or remote hosts; (c) one or more gaming devices in combination with one or more electronic gaming machines; (d) one or more gaming devices, one or more electronic gaming machines, and one or more central servers, central controllers, or remote hosts in combination with one another; (e) a single electronic gaming machine; (f) a plurality of electronic gaming machines in combination with one another; (g) a single gaming device; (h) a plurality of gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "gaming device" as used herein represents one gaming device or a plurality of gaming devices and, in some embodiments, may include an EGM or multiple EGMs. The use of "server, central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a communication network, the communication network may include a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a communication network, the communication network may include a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the communication network includes a WAN, the gaming system includes a central server, central controller, or remote host and an EGM each located in a different gaming establishment in a same geographic area, such as a same city or a same state. Gaming systems in which the communication network includes a WAN are substantially identical to gaming systems in which the communication network includes a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a communication network, the communication network may include an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method, comprising:

receiving sensor data from one or more sensors embedded in a gaming device, wherein the one or more sensors output a signal as the sensor data to provide an output corresponding to a physical condition detected by the one or more sensors;

providing the sensor data to a machine learning model, wherein the machine learning model processes the sensor data and is trained to detect a number of players in proximity of the gaming device based on the sensor data;

causing, through application of a first set of game instructions, first gameplay graphics to be rendered and first audio content to be provided by a user interface of a gaming device in response to the machine learning model providing an output indicating, based on processing the sensor data, that a single player is interacting with the user interface of the gaming device; and causing, through application of a second set of game instructions that are different from the first set of game instructions, second gameplay graphics to be rendered and second audio content to be provided by the user interface of the gaming device in response to the machine learning model providing the output indicating, based on processing the sensor data, that two or more players are interacting with the user interface of the gaming device, wherein the second gameplay graphics comprise at least one gameplay graphic that is not included in the first gameplay graphics, and wherein the second audio content provides different audio outputs to each of the two or more players.

2. The method of claim 1, further comprising:

responsive to the output of the machine learning model indicating that the two or more players are interacting with the user interface, dynamically increasing a number of random outputs utilized for the second set of game instructions as compared to the first set of game instructions.

3. The method of claim 2, wherein the number of random outputs is increased by invoking an additional random number generator to generate an additional random number for additional game outcomes.

4. The method of claim 1, wherein the second set of game instructions comprise at least one modified game rule as compared to the first set of game instructions, wherein the at least one modified game rule comprises at least one of a modified pay table, modified odds, modified bonus opportunities, modified user inputs, modified graphics, different games, different game features, and different game symbols.

5. The method of claim 1, wherein the sensor data comprises data received from an infrared sensor.

6. The method of claim 1, further comprising:

adjusting at least one of a position and size of input buttons based on determining that the two or more players are interacting with the user interface.

7. The method of claim 6, wherein adjusting at least one of the position and size of input buttons comprises changing a number of touch sensitive areas as input buttons presented by a user input portion of the user interface.

8. The method of claim 7, wherein at least one type of input button is presented redundantly by the user input portion of the user interface such that a first player is presented with a first instance of the at least one type of input button and such that a second player is presented with a second instance of the at least one type of input button.

9. The method of claim 1, further comprising:

partially obscuring at least one graphical user interface element in the first gameplay graphics to limit an ability of a second player to view the at least one graphical user interface element.

10. The method of claim 1, wherein the sensor data comprises data received from a camera.

11. The method of claim 1, wherein the second audio content comprises a first audio output and a second audio output, the method further comprising:

aiming the first audio output to a first region positioned in proximity of the user interface; and aiming the second audio output to a second region positioned in proximity of the user interface, wherein at least some of the first region does not overlap with at least some of the second region.

12. The method of claim 11, wherein the first audio output is generated based on a first game sound preference of a first player, wherein the second audio output is generated based on a second game sound preference of a second player.

13. A method, comprising:

causing gameplay graphics to be rendered by a user interface in accordance with game outcomes generated based on application of game rules to user inputs;

receiving sensor data from a sensor embedded in a gaming device, wherein the sensor outputs a signal as the sensor data to electrically indicate a physical condition detected by the sensor;

providing the sensor data to a machine learning model, wherein the machine learning model processes the sensor data and is trained to detect a number of players in proximity of the gaming device based on the sensor data;

dynamically modifying the game rules in response to the machine learning model providing an output indicating, based on processing the sensor data, that the number of players positioned in proximity of the user interface is greater than one;

generating additional game outcomes based on applying the modified game rules to user inputs;

causing additional gameplay graphics and additional audio content to be provided by the user interface in response to the machine learning model providing the output indicating, based on processing the sensor data, that the detected number of players is greater than one, in accordance with the additional game outcomes, wherein the additional audio content is produced by at least one speaker to provide different audio outputs to each player in the identified number of players; and adjusting at least one of a position and size of input buttons in response to the machine learning model providing the output indicating, based on processing the sensor data, that the number of players is greater than one.

14. The method of claim 13, further comprising:

dynamically increasing a number of random outputs utilized by the game rules based on the number of players being greater than one.

15. The method of claim 13, wherein the sensor data is received from the sensor and a plurality of additional sensors embedded in the gaming device.

16. The method of claim 15, wherein the sensor and the plurality of additional sensors comprise a pressure sensor in a set of the gaming device.

17. The method of claim 13, wherein the sensor comprises an infrared sensor.

18. The method of claim 13, further comprising:

providing modified odds based on the identified number of players being greater than one.

19. The method of claim 13, wherein adjusting at least one of the position and size of input buttons comprises changing a number of input buttons presented by a user input portion of the user interface.

20. A gaming system, comprising:

a processor; and memory coupled with the processor and storing instructions that, when executed by the processor, cause the processor to:

receive sensor data from one or more sensors embedded in a gaming device, wherein the one or more sensors output a signal as the sensor data to provide an output corresponding to a physical condition detected by the one or more sensors;

provide the sensor data to a machine learning model, wherein the machine learning model processes the sensor data and is trained to detect a number of players in proximity of the gaming device based on the sensor data;

cause, through application of a first set of game instructions, first gameplay graphics to be rendered and first audio content to be provided by a user interface of a gaming device in response to the machine learning model providing an output indicating, based on processing the sensor data, that a single player is interacting with the user interface of the gaming device; and cause, though application of a second set of game instructions that are different from the first set of game instructions, second gameplay graphics to be rendered and second audio content to be provided by the user interface of the gaming device in response to the machine learning model providing the output indicating, based on processing the sensor data, that two or more players are interacting with the user interface of the gaming device, wherein the second gameplay graphics comprise at least one gameplay graphic that is not included in the first gameplay graphics, and wherein the second audio content provides different audio outputs to each of the two or more players.

* * * * *